United States Patent
Sun et al.

(10) Patent No.: US 9,175,220 B2
(45) Date of Patent: *Nov. 3, 2015

(54) HIGH SCATTERING SMECTIC LIQUID CRYSTAL MATERIAL AND DISPLAY DEVICE USING THE SAME

(75) Inventors: Gang Sun, Suzhou (CN); Wenlei Li, Suzhou (CN); Huan Yin, Suzhou (CN)

(73) Assignee: Halation Photonics Corporation, Jiangsu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/002,961

(22) PCT Filed: Dec. 30, 2011

(86) PCT No.: PCT/CN2011/085036
§ 371 (c)(1),
(2), (4) Date: Sep. 3, 2013

(87) PCT Pub. No.: WO2013/097181
PCT Pub. Date: Jul. 4, 2013

(65) Prior Publication Data
US 2013/0342775 A1    Dec. 26, 2013

(30) Foreign Application Priority Data
Dec. 29, 2011    (CN) .......................... 2011 1 0451207

(51) Int. Cl.
| | |
|---|---|
| G02F 1/1333 | (2006.01) |
| C09K 19/44 | (2006.01) |
| C09K 19/18 | (2006.01) |
| C09K 19/42 | (2006.01) |
| C09K 19/20 | (2006.01) |
| C09K 19/30 | (2006.01) |
| C09K 19/34 | (2006.01) |
| C09K 19/40 | (2006.01) |
| C09K 19/04 | (2006.01) |
| C09K 19/12 | (2006.01) |
| G02F 1/137 | (2006.01) |
| G02F 1/00 | (2006.01) |

(52) U.S. Cl.
CPC ................ *C09K 19/44* (2013.01); *C09K 19/18* (2013.01); *C09K 19/20* (2013.01); *C09K 19/3068* (2013.01); *C09K 19/3458* (2013.01); *C09K 19/3466* (2013.01); *C09K 19/3475* (2013.01); *C09K 19/3491* (2013.01); *C09K 19/3497* (2013.01); *C09K 19/406* (2013.01); *C09K 19/42* (2013.01); *C09K 2019/0466* (2013.01); *C09K 2019/124* (2013.01); *C09K 2019/181* (2013.01); *C09K 2019/183* (2013.01); *C09K 2019/3019* (2013.01); *C09K 2019/3425* (2013.01); *G02F 1/0045* (2013.01); *G02F 1/13781* (2013.01)

(58) Field of Classification Search
CPC ........ C09K 19/44; C09K 19/18; C09K 19/42; C09K 19/20; C09K 19/3068; C09K 19/3458; C09K 19/406; C09K 19/3466; C09K 19/3475; C09K 19/3491; C09K 19/3497; C09K 2019/0466; C09K 2019/124; C09K 2019/183; C09K 2019/3019; C09K 2019/181; C09K 2019/3425; G02F 1/13781; G02F 1/0045; G02F 1/1333
USPC ............ 349/35, 167, 182; 252/299.01, 299.6, 252/299.61–299.63, 299.66, 299.67; 428/1.1, 1.3
See application file for complete search history.

(56) References Cited

U.S. PATENT DOCUMENTS

| | | | |
|---|---|---|---|
| 8,366,964 B2 * | 2/2013 | Maeda et al. ............ 252/299.63 |
| 2011/0260104 A1 | 10/2011 | Maeda et al. |
| 2014/0160384 A1 * | 6/2014 | Li et al. .......................... 349/33 |

FOREIGN PATENT DOCUMENTS

| | | |
|---|---|---|
| JP | H1077476 A | 3/1998 |
| JP | 2002146353 A | 5/2002 |
| JP | 2011090858 A | 5/2011 |

OTHER PUBLICATIONS

Halation Photonics Corporation, International Search Report, PCT/CN2011/085036, Oct. 4, 2012, 3 pgs.

* cited by examiner

*Primary Examiner* — Geraldina Visconti
(74) *Attorney, Agent, or Firm* — Morgan, Lewis & Bockius LLP

(57) ABSTRACT

The present invention relates to a high scattering smectic liquid crystal material and display device using the same. In the present invention, a series of smectic A phase liquid crystals having compact arrangement of crystal domains or a series of smectic liquid crystal mixed materials having a degree of order higher than that of the smectic A phase and an optical texture different from that of the smectic A phase are obtained by mixing a smectic liquid crystal with an organic compound having a high optical anisotropy (Δn) or mixing different types of smectic phases. When used in a smectic stable state liquid crystal display pattern, these materials have high scattering properties and can effectively improve the contrast of a smectic liquid crystal display device. The present invention also improves contrast when it used in a reflective smectic liquid crystal display device.

16 Claims, 7 Drawing Sheets

HIGH SCATTERING SMECTIC LIQUID CRYSTAL MATERIAL AND DISPLAY DEVICE USING THE SAME

CROSS REFERENCE TO RELATED APPLICATIONS

This application is a United States National Stage application filed under 35 U.S.C. §371 of PCT Patent Application Serial No. PCT/CN2011/085036 filed on Dec. 30, 2011 which claims benefit of and priority to Chinese Patent Application Serial No. 201110451207.7 filed Dec. 29, 2011, the disclosures of all of which are hereby incorporated by reference in their entirety.

TECHNICAL FIELD

The present invention relates to a high scattering smectic liquid crystal material and displays using the same, which belong to the technical field of optical display materials and display devices.

BACKGROUND OF THE INVENTION

The study on using smectic liquid crystal as display material has a history of over 30 years. Monitors using the smectic liquid crystals as the display materials are reflective display devices, which have no polarizer plate and backlight, compared with common liquid crystal display devices. Such monitors rely mainly on reflection of external light, resulting in lower contrast and making commercialization more difficult.

The study on the smectic liquid crystal material is focused on ferroelectric liquid crystal and antiferroelectric liquid crystal that belong to smectic A phase and smectic C phase. The ferroelectric liquid crystal and antiferroelectric liquid crystal materials are used in surface stabilized display devices. Since uniform, perfect and regular arrangement is required for both the liquid crystal molecules and the liquid crystal layers in this kind of devices, and the thickness of a liquid crystal cell is required to be 1 to 2 μm, the manufacturing process of such devices is very difficult, and large scale production cannot be achieved, so the ferroelectric liquid crystal devices have not enter a practical commercial application stage.

There are few smectic liquid crystal materials. WO 2010/070606 A1 discloses a method for obtaining a wide-temperature range smectic phase. Actual tests show that the contrast of this material is undesirable, making it infeasible to be used in actual display devices.

Therefore, in the field of display application of multi-stable liquid crystals, there is an urgent need for a high scattering smectic liquid crystal material that can be used in display devices having an excellent optical structure, so as to increase the contrast of the smectic crystal display devices and achieve a good display effect.

SUMMARY OF THE INVENTION

The present invention is directed to a series of smectic liquid crystal mixed materials having high scattering, and the smectic liquid crystal mixed materials having high scattering are successfully applied to display devices having an excellent optical structure, in combination with a drive method suitable for the display material, thereby obtaining a smectic multi-stable liquid crystal display device that is available for commercial applications, has a high contrast and a good display quality, and is energy saving.

In the present invention, a series of smectic A phase liquid crystals having compact arrangement of crystal domains or a series of smectic liquid crystal mixed materials having a degree of order higher than that of the smectic phase A and an optical texture different from that of the smectic A phase, for example, the smectic B, H and G, are obtained by mixing smectic liquid crystal compounds of different types or mixing a smectic liquid crystal compound with an organic compound having a high optical anisotropy ($\Delta n$). When being applied in a smectic stable state liquid crystal display mode, this type of materials have a high scattering state, so the contrast of the smectic liquid crystal display devices can be effectively improved. When the present invention is applied to a reflective smectic liquid crystal display device, a smectic display device having a high contrast is obtained.

In the present invention, a mixed liquid crystal having high scattering is prepared. The high scattering smectic liquid crystal material of the present invention is a mixed liquid crystal material, comprising two or more compound represented by Formula (I).

Formula (I)

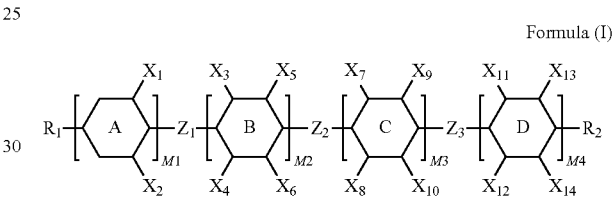

In Formula (I), $R_1$ is $C_1$-$C_{20}$ alkyl, $C_1$-$C_{20}$ alkoxy, $C_1$-$C_{20}$ alkenyl, $C_1$-$C_{20}$ alkenyloxy, silanyl, siloxanyl and halogenated groups thereof; and $C_1$-$C_{20}$ alkyl, $C_1$-$C_{20}$ alkoxy, $C_1$-$C_{20}$ alkenyl, $C_1$-$C_{20}$ alkenyloxy, silanyl and siloxanyl and isomers thereof with any —$CH_2$— substituted with —O—, —S—, —$CF_2$—, —$CF_2O$—, —CO—, —COO—, —O—CO—, —O—COO—, —CF═CF—, —CH═CF—, —CF═CH— or —CH═CH—;

Preferably, $R_1$ is selected from the group consisting of: $C_1$-$C_{15}$ alkyl, $C_1$-$C_{15}$ alkoxy, $C_1$-$C_{15}$ alkenyl, $C_1$-$C_{15}$ alkenyloxy, $C_1$-$C_{15}$ silanyl, $C_1$-$C_{15}$ siloxanyl and halogenated groups thereof; and $C_1$-$C_{15}$ alkyl, $C_1$-$C_{15}$ alkoxy, $C_1$-$C_{15}$ alkenyl, $C_1$-$C_{15}$ alkenyloxy, $C_1$-$C_{15}$ silanyl and $C_1$-$C_{15}$ siloxanyl and isomers thereof with any —$CH_2$— substituted with —O— or —S—.

More preferably, $R_1$ is selected from the group consisting of: $C_1$-$C_{10}$ alkyl, $C_1$-$C_{10}$ alkoxy, $C_1$-$C_{10}$ alkenyl, $C_1$-$C_{10}$ silanyl, $C_1$-$C_{10}$ siloxanyl and halogenated groups thereof; and $C_1$-$C_{10}$ alkyl, $C_1$-$C_{10}$ alkoxy, $C_1$-$C_{10}$ alkenyl, $C_1$-$C_{10}$ silanyl and $C_1$-$C_{10}$ siloxanyl and isomers thereof with any —$CH_2$— substituted with —O—.

$R_2$ is CN, F, NCS, NCO, $CF_3$, $CHF_2$, $CH_2F$, $OCF_3$, $OCHF_2$, $OCH_2F$, $NO_2$, Cl, CH═$CF_2$ and OCH═$CF_2$; $C_1$-$C_{20}$ alkyl, $C_1$-$C_{20}$ alkoxy, $C_1$-$C_{20}$ alkenyl, $C_1$-$C_{20}$ alkenyloxy, $C_1$-$C_{20}$ silanyl and $C_1$-$C_{20}$ siloxanyl, and halogenated groups thereof; and $C_1$-$C_{20}$ alkyl, $C_1$-$C_{20}$ alkoxy, $C_1$-$C_{20}$ alkenyl and $C_1$-$C_{20}$ alkenyloxy and isomers thereof with any —$CH_2$— substituted with —O—, —S—, —$CF_2$—, —$CF_2O$—, —CO—, —COO—, —O—CO—, —O—COO—, —CF═CF—, —CH═CF—, —CF═CH— or —CH═CH—.

Preferably, $R_2$ is selected from the group consisting of: CN, F, NCS, $CF_3$, $CHF_2$, $CH_2F$, $OCF_3$, $OCHF_2$, $OCH_2F$, and Cl; $C_1$-$C_{15}$ alkyl, $C_1$-$C_{15}$ alkoxy, $C_1$-$C_{15}$ alkenyl, $C_1$-$C_{15}$ alkenyloxy, $C_1$-$C_{15}$ silanyl, $C_1$-$C_{15}$ siloxanyl and halogenated groups thereof; and $C_1$-$C_{15}$ alkyl, $C_1$-$C_{15}$ alkoxy, $C_1$-$C_{15}$ alkenyl and $C_1$-$C_{15}$ alkenyloxy and isomers thereof with any —$CH_2$— substituted with —O— or —S—.

More preferably, $R_2$ is CN, F, NCS, $CF_3$ or $OCF_3$.

A, B, C and D each has a rigid ring structure and each independently comprises:

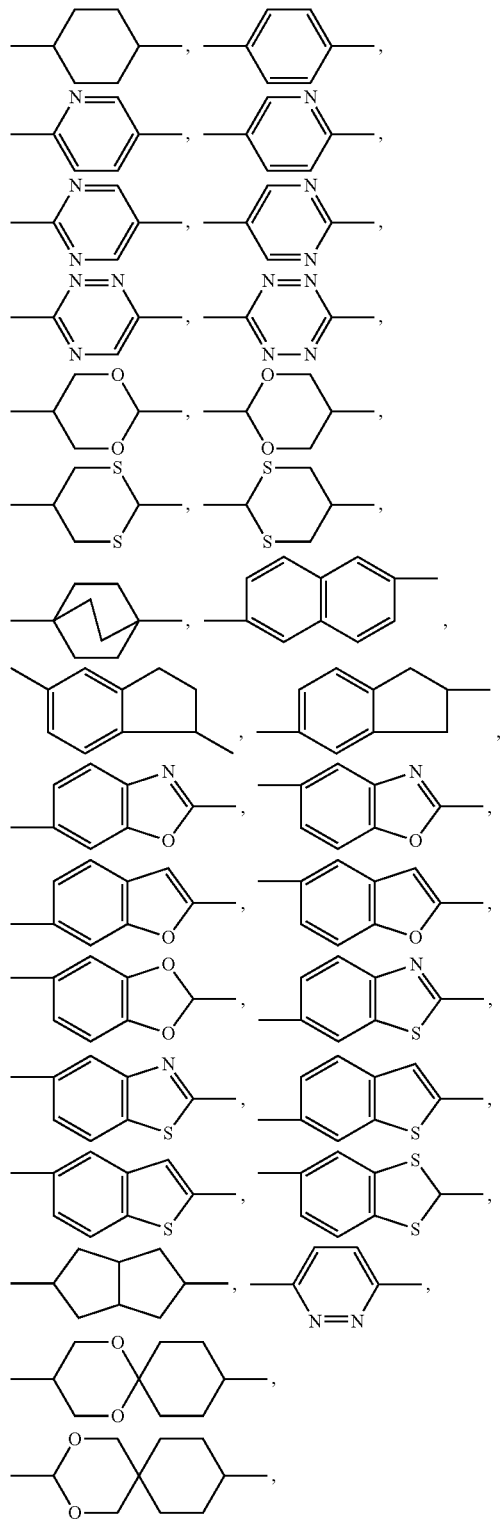

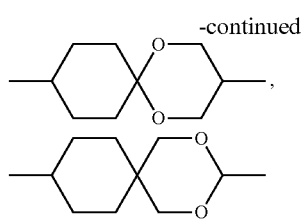

or cycloalkenyl; wherein the hydrogen atoms $X_1$ to $X_{14}$ on the ring structures are either unsubstituted or indendently substituted with CN, F, $CF_3$, $CHF_2$, $CH_2F$, $OCF_3$, $OCHF_2$, $OCH_2F$, $NO_2$, Cl, alkyl or alkoxy.

Preferably, A, B, C and D are independently selected from the group consisting of:

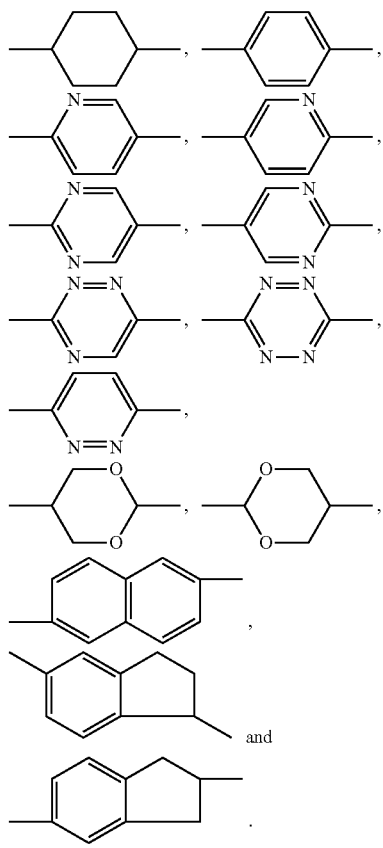

More preferably, A, B, C and D are independently selected from the group consisting of:

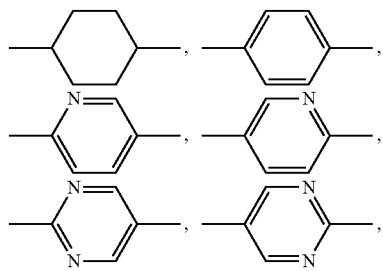

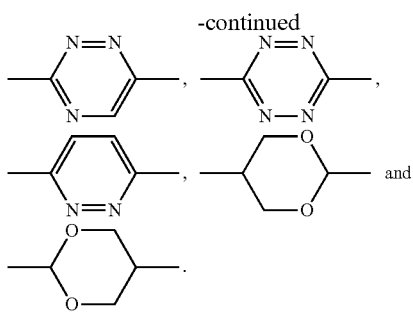

$Z_1$ to $Z_3$ are independently: a single bond (that is, two rigid moieties are directly connected), $C_1$-$C_{20}$ alkyl, $C_1$-$C_{20}$ alkoxy, $C_1$-$C_{20}$ alkenyl, $C_1$-$C_{20}$ alkenyloxy, $C_1$-$C_{20}$ silanyl and $C_1$-$C_{20}$ siloxanyl; and $C_1$-$C_{20}$ alkyl, $C_1$-$C_{20}$ alkoxy, $C_1$-$C_{20}$ alkenyl, $C_1$-$C_{20}$ alkenyloxy, $C_1$-$C_{20}$ silanyl and $C_1$-$C_{20}$ siloxanyl and isomers thereof with any —CH$_2$— substituted with —O—, —S—, —CO—, —COO—, —O—CO—, —O—COO—, —CF=CF—, —CHF—, —CF$_2$—, —CF$_2$O—, —CH$_2$O—, —OCH$_2$—, —CH=CH—, —CH=N—, —C≡C—, —CH=N—N=CH—, —CH=CF—, —CF=CH—, —CH$_2$CF$_2$—, —CF$_2$CH$_2$— or

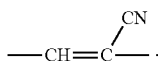

Preferably, $Z_1$ to $Z_3$ are independently selected from the group consisting of: a single bond, —C$_2$H$_4$—, —CH=CH—, —C≡C—, —CF$_2$O—, —CH$_2$O—, —COO— and —CH=N—N=CH—.

More preferably, $Z_1$ to $Z_3$ are independently selected from the group consisting of: a single bond, —C$_2$H$_4$—, —CH=CH—, —C≡C—, —CF$_2$O—, —CH$_2$O— and —COO—.

$X_1$ to $X_{14}$ are independently selected from the group consisting of: H, CN, NCS, F, Cl, CF$_3$, CHF$_2$, CH$_2$F, OCF$_3$, OCHF$_2$, OCH$_2$F, NO$_2$, alkyl and alkoxy.

Preferably, $X_1$ to $X_{14}$ are independently selected from the group consisting of: H, CN, NCS, F, C$_1$ and CF$_3$.

More preferably, $X_1$ to $X_{14}$ are independently selected from the group consisting of: H, CN, F and Cl.

M1, M2, M3 and M4 are independently 0, 1 or 2, and M1+M2+M3+M4≥2. Preferably, M1, M2, M3 and M4 are independently 0 or 1, and M1+M2+M3+M4≥2.

When being used as a display material, any compound alone cannot satisfy all requirements, so a variety of compounds having excellent photoelectric properties are selected and mixed at a certain ratio to form a mixed liquid crystal for the purpose of satisfying various performance requirements. Similarly, in order to further improve the degree of scattering of the smectic liquid crystal material on a basis of ensuring the other excellent properties, selection of the compounds and the formulation ratio thereof need to be optimized. Therefore, in the present invention, mixing of different compounds is studied and a high scattering mixed smectic liquid crystal material that can improve the contrast is provided.

In the present invention, a mixed liquid crystal having high scattering is prepared. In addition to two or more organic compound represented by Formula (I), the high scattering smectic liquid crystal material of the present invention may further comprise one or more ionic compound represented by Formula (II).

$$R_3—X^+Y^- \quad \text{Formula (II)}$$

In Formula (II), $R_3$ is: $C_0$-$C_{20}$ alkyl, $C_0$-$C_{20}$ alkoxy, $C_0$-$C_{20}$ alkenyl and $C_0$-$C_{20}$ alkenyloxy, and halogenated groups thereof; ferrocenylmethyl and phenyl; and $C_0$-$C_{20}$ alkyl, $C_0$-$C_{20}$ alkoxy, $C_0$-$C_{20}$ alkenyl, $C_0$-$C_{20}$ alkenyloxy and isomers thereof with any —CH$_2$— substituted with —O—, —S—, —CF$_2$—, —CF$_2$O—, —CO—, —COO—, —O—CO—, —O—COO—, —CF=CF—, —CH=CF—, —CF=CH—, —CH=CH—,

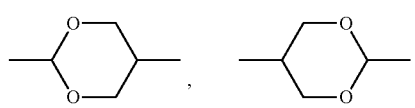

or phenyl.

Preferably, $R_3$ is selected from the group consisting of: $C_0$-$C_{16}$ alkyl, $C_0$-$C_{16}$ alkoxy, $C_0$-$C_{16}$ alkenyl, $C_0$-$C_{16}$ alkenyloxy, ferrocenylmethyl and phenyl; and $C_0$-$C_{16}$ alkyl, $C_0$-$C_{16}$ alkoxy, $C_0$-$C_{16}$ alkenyl and $C_0$-$C_{16}$ alkenyloxy and isomer thereof with any —CH$_2$— substituted with —O—, —S—,

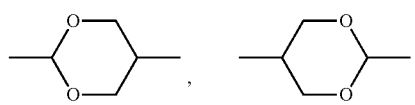

and phenyl.

More preferably, $R_3$ is selected from the group consisting of: $C_0$-$C_{16}$ alkyl, phenyl; and $C_0$-$C_{16}$ alkyl and isomers thereof with any —CH$_2$— substituted with

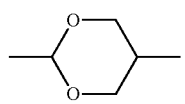

and phenyl.

$X^+$ is a cation selected from the group consisting of: Na$^+$, K$^+$, N$^+$, [(R$_4$)$_3$]N$^+$, [(R$_4$)$_3$]P$^+$,

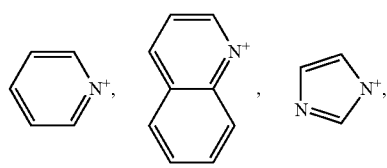

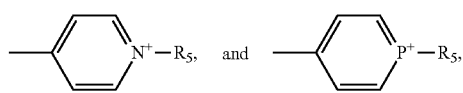

wherein $R_4$ is $C_1$-$C_{30}$ alkyl, $C_1$-$C_{30}$ alkoxy, $C_1$-$C_{30}$ alkenyl, $C_1$-$C_{30}$ alkenyloxy or halogenated groups thereof, or phenyl, and $R_5$ is $C_1$-$C_{30}$ alkyl, $C_1$-$C_{30}$ alkoxy, $C_1$-$C_{30}$ alkenyl, $C_1$-$C_{30}$ alkenyloxy, or halogenated groups thereof, or phenyl.

Preferably, X+ is a cation selected from the group consisting of: Na+, K+, N+, [(R4)3]N+, [(R4)3]P+,

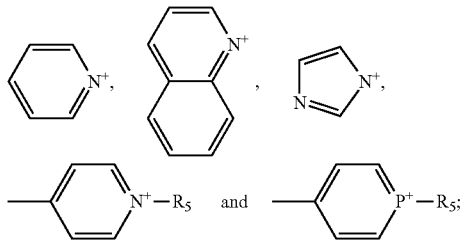

wherein R4 is C1-C20 alkyl, C1-C20 alkoxy, C1-C20 alkenyl, C1-C20 alkenyloxy, or halogenated groups thereof, or phenyl; and R5 is C1-C20 alkyl, C1-C20 alkoxy, C1-C20 alkenyl, C1-C20 alkenyloxy, or halogenated groups thereof, and phenyl.

More preferably, X+ is a cation selected from the group consisting of: Na+, K+, N+, [(R4)3]N+, [(R4)3]P+,

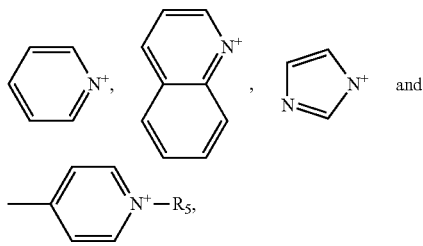

wherein R4 is C1-C16 alkyl or phenyl; and R5 is C1-C16 alkyl or phenyl.

$Y^-$ is an anion selected from the group consisting of: $F^-$, $Cl^-$, $Br^-$, $I^-$, $(PF_6)^-$, $(Ph_4B)^-$, $SO_4^-$, $ClO_4^-$ and

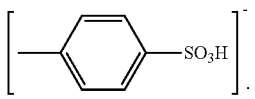

Preferably, $Y^-$ is an anion selected from the group consisting of: $F^-$, $Cl^-$, $Br^-$, $(PF_6)^-$, $(Ph_4B)^-$, $SO_4^-$, $ClO_4^-$; and

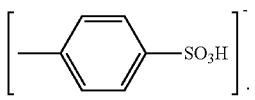

More preferably, $Y^-$ is an anion selected from the group consisting of: $F^-$, $Cl^-$, $Br^-$, $(PF_6)^-$, $(Ph_4B)^-$, $SO_4^-$ and $ClO_4^-$.

Most preferably, the ionic compound represented by Formula (II) has a structure represented by Formula (VII), Formula (VII)

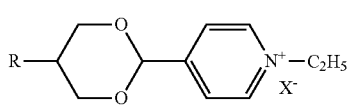

wherein R is selected from the group consisting of: $C_0$-$C_{16}$ alkyl and $C_0$-$C_{16}$ terminal alkenyl; and $X^-$ is an anion selected from the group consisting of: $F^-$, $Cl^-$, $Br^-$, $(PF_6)^-$, $(Ph_4B)^-$, $SO_4^-$ and $ClO_4^-$.

In the present invention, a series of mixed liquid crystals having compact arrangement of crystal domains are obtained with the novel high scattering smectic liquid crystal material through mixing, so that the light entering the mixed liquid crystals exhibit a higher scattering state. The high scattering smectic liquid crystal material of the present invention may be a smectic A phase or a non-smectic A phase liquid crystal material, where the non-smectic A phase liquid crystal material may be a smectic B, C, D, E, F, G, H, or I phase material, or a undefined smectic X phase materials having a degree of order higher than that of the smectic A phase. The mixed material may be used in existing smectic liquid crystal display devices, and the contrast of the existing display devices can be effectively improved.

The high scattering smectic liquid crystal material of the present invention preferably contains a smectic liquid crystal compound and at least one of a compound A, a compound B and a compound C.

DETAILED DESCRIPTION OF THE INVENTION

Figure 1:
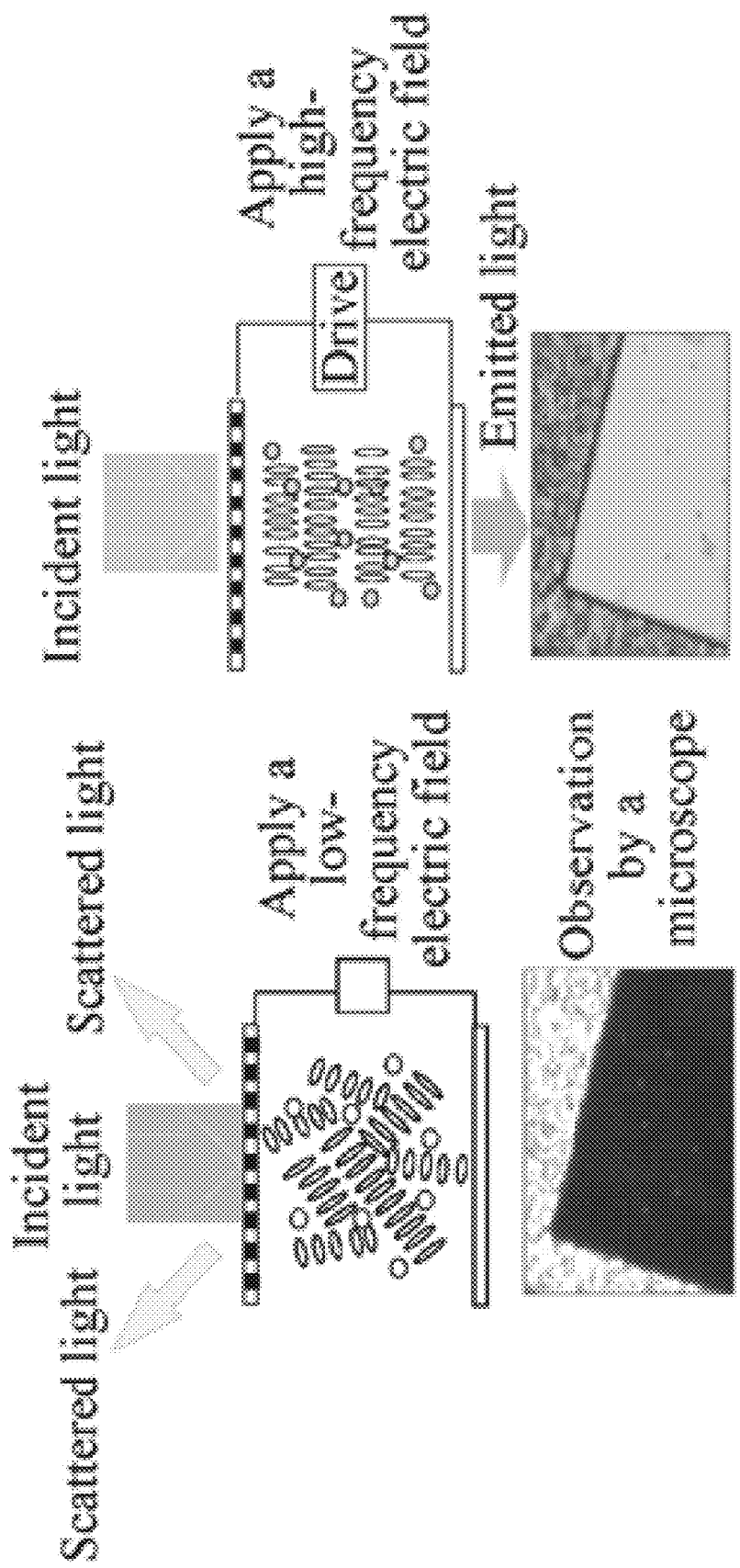
FIG. 1 is a schematic view of the drive display principle of a smectic liquid crystal.

In the present invention, the following aspects are studied.
1) Long-Carbon Chain Smectic Materials 50 wt % cyanobiphenyl compounds having different carbon chain lengths are mixed with 50 wt % I102 and 10OCB, where I102:10OCB=4:1 (weight ratio). After mixing, 4 wt ‰ cetyltrimethyl ammonium perchlorate is added, to prepare a liquid crystal mixed layer; and then, the transmittance at clearing state, the transmittance at frosting state and the contrast are tested, with the results shown in Table 1.

Linear cyanobiphenyl compounds are a very important class of compounds, and are the smectic A phase materials when the number of carbon in the chain section is higher than 8. It can be seen that, long carbon chain is favorable for the formation of the smectic phase, so it is supposed that the contrast may be improved by extending the carbon chain. Therefore, the linear cyanobiphenyl compounds having different carbon chain lengths are compared (data is shown in Table 1); however, it is found that 8CB with the shortest chain has the best effect.

TABLE 1

Influence of cyanobiphenyl compounds having different carbon chain lengths on the contrast

| Content in formulation (wt %) | | Trans-mittance at clearing state | Transmittance at frosting state | Contrast |
|---|---|---|---|---|
| (50 wt %) | Cyanobiphenyl having different carbon chains (50 wt %) | | | |
| I102:10OCB = 4:1 | 8CB | 90% | 22% | 4.09:1 |
| | 9CB | 90% | 23% | 3.91:1 |
| | 10CB | 90% | 23% | 3.91:1 |
| | 11CB | 90% | 24% | 3.75:1 |
| | 12CB | 90% | 24% | 3.75:1 |
| | 13CB | 90% | 25% | 3.6:1 |
| | 14CB | 90% | 26% | 3.46:1 |
| | 15CB | 90% | 30% | 3.00:1 |
| | 16CB | 90% | 30% | 3.00:1 |

Note
The above formulations contain 4 wt % cetyltrimethyl ammonium perchlorate;

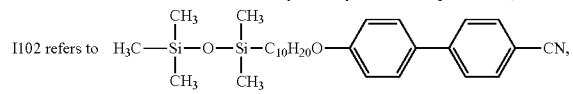

I102 refers to

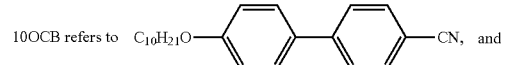

10OCB refers to        , and the figure before CB represents the number of carbon atoms in the carbon chain 2) Reduction of Amount of Siloxane Liquid Crystals Different amounts of I102 are mixed with 10OCB, 8CB and B1, where 10OCB:8CB:B1=1:2:1 (weight ratio). After mixing, 4 wt ‰ cetyltrimethyl ammonium perchlorate is added, to prepare a liquid crystal mixed layer; and then, the transmittance at clearing state, the transmittance at frosting state and the contrast are tested, with the results shown in Table 2.

The structure of the siloxane liquid crystal molecule contains a flexible and large siloxanyl group, the flexible long chain section of the siloxane liquid crystal molecule is long, the ratio of the volume of the flexible moiety in the whole molecular size is large, and generally, the interstice caused by arrangement of the flexible moiety in the smectic layer is higher than that caused by the rigid moiety, so the "interstices" in the smectic layer formed in siloxane liquid crystal are more, and the probability of the light passing through these "interstices" is large at frosting state. Therefore, the transmittance at frosting state is large, and the contrast is low. In theory, the contrast may be improved by reducing the content of the siloxane liquid crystal in the formulation. A series of experiments show that when the amount of siloxane liquid crystals is lower than 10%, the contrast can be up to 5:1.

TABLE 2

Data of influence of the content of siloxane liquid crystals on the contrast

| Content in formulation (wt %) | | Transmittance at clearing state | Transmittance at frosting state | Contrast |
|---|---|---|---|---|
| 10OCB:8CB = 1:2 | I102 | | | |
| 50 | 50 | 90% | 30% | 3.00:1 |
| 55 | 45 | 90% | 30% | 3.00:1 |
| 60 | 40 | 90% | 25% | 3.60:1 |
| 65 | 35 | 90% | 22% | 4.09:1 |

TABLE 2-continued

Data of influence of the content of siloxane liquid crystals on the contrast

| Content in formulation (wt %) | | Transmittance at clearing state | Transmittance at frosting state | Contrast |
|---|---|---|---|---|
| 10OCB:8CB = 1:2 | I102 | | | |
| 70 | 30 | 90% | 22% | 4.09:1 |
| 75 | 25 | 90% | 21% | 4.28:1 |
| 80 | 20 | 90% | 20% | 4.50:1 |
| 85 | 15 | 90% | 19% | 4.73:1 |
| 90 | 10 | 90% | 18% | 5.00:1 |
| 95 | 5 | 90% | 18% | 5.00:1 |

Note
The above formulations contain 4 wt ‰ cetyltrimethyl ammonium perchlorate.

3) Addition of Compounds Having a Large Optical Anisotropy (Δn) for Mixing the contrast of the liquid crystal material is significantly correlated with the optical anisotropy (Δn) of the liquid crystal material, and in general, the liquid crystal material having a high optical anisotropy (Δn) has a high contrast, so it is tried to adding a liquid crystal material having a high optical anisotropy (Δn) for mixing.

A) Addition of Alkyne Liquid Crystals

In the nematic phase formulation, in order to improve the contrast of the liquid crystal, an alkyne liquid crystal material having a high optical anisotropy (Δn) is often added. It is found that addition of the alkyne liquid crystal can improve the contrast of the smectic liquid crystal formulation; however, it is found through repeated experiments that the change of the contrast of the smectic phase formulation varies with the amount of the alkyne liquid crystal material, that is, at the beginning, the contrast of the smectic phase formulations gradually increases with the increase of the amount of the alkyne liquid crystal material, and after the contrast reaches 7.5:1, the contrast maintains constant and then gradually drops with the increase of the amount of the alkyne liquid crystal material, with the specific date shown in Table 3.

TABLE 3

Experimental data of addition of alkyne liquid crystal to improve the contrast

| Content in formulation (wt %) | | Transmittance at clearing state | Transmittance at frosting state | Contrast |
|---|---|---|---|---|
| I102:8CB = 1:4 | Alkyne liquid crystal | | | |
| 100 | 0 | 90% | 30% | 3.00:1 |
| 95 | 5 | 90% | 22% | 4.09:1 |
| 90 | 10 | 90% | 15% | 6.00:1 |
| 85 | 15 | 90% | 12% | 7.50:1 |
| 80 | 20 | 90% | 12% | 7.50:1 |
| 75 | 25 | 90% | 15% | 6.00:1 |
| 70 | 30 | 90% | 15% | 6.00:1 |
| 65 | 35 | 90% | 22% | 4.09:1 |
| 60 | 40 | 90% | 30% | 3.00:1 |

Note
The above formulations contain 4 wt % cetyltrimethyl ammonium perchlorate; and the alkyne liquid crystal has a structure below:

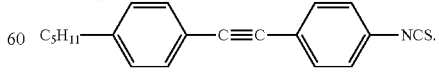

The method for improving the contrast by adding an alkyne liquid crystal is not limited to the materials having the structures above, and addition of the alkyne liquid crystal materials having a structure other than the structures of Formulas above can also improve the contrast.

B) Addition of Cyanoterphenyl Liquid Crystals

5CT (n-pentyl cyanoterphenyl) materials are a type of materials that are commercially available and have a high optical anisotropy (Δn), and are used in some experiments. It is found that when the content of 5CT is higher than 20 wt %, it is difficult to dissolve, and when the content is increased to 10%, the limit of the contrast is reached, and further addition had no contribution to the contrast, with the data shown in Table 4.

TABLE 4

Influence of the content of 5CT on the contrast

| Content in formulation (wt %) | | Transmittance at clearing state | Transmittance at frosting state | Contrast |
|---|---|---|---|---|
| I102:8CB = 1:4 | 5CT | | | |
| 70 | 30 | — | — | — |
| 75 | 25 | — | — | — |
| 80 | 20 | 90% | 15% | 6:1 |
| 85 | 15 | 90% | 15% | 6:1 |
| 90 | 10 | 90% | 15% | 6:1 |
| 95 | 5 | 90% | 18% | 5:1 |
| 100 | 0 | 90% | 30% | 3:1 |

Note
The above formulations contain 4 wt ‰ cetyltrimethyl ammonium perchlorate; and — represents cannot be dissolved.

C) Addition of Polycyclic Materials

In general, the larger the conjugated moiety in the liquid crystal material, the higher the optical anisotropy (Δn), where the conjugated moiety in the material generally depends on the rigid moiety, and the rigid moiety generally formed by multiple rigid rings through connection. By comparison of multiple polycyclic materials, a polyphenyl material having an excellent performance is found, which has a contrast of up to 8:1, with data shown in table 5.

TABLE 5

Influence of polycyclic materials on the contrast

| Content in formulation (wt %) | | Contrast |
|---|---|---|
| 80% I102:8CB = 1:4 | 20% $C_3H_7$—⬡—⬡—COO—⬡—⬡(F)—CN | 6:1 |
| | 20% $C_3H_7$—⬡—⬡—⬡—⬡(F,F,F) | 5:1 |
| | 20% $C_5H_{11}$—⬡—⬡—COO—⬡—⬡(F)—CN | 5:1 |
| | 20% $C_3H_7$—⬡—⬡(F)—⬡(F,F)—CF$_2$O—⬡(F,F,F)—F | 8:1 |
| | 20% $C_3H_7$—⬡—⬡—⬡(F,F)—⬡(F,F)—F | 6.5:1 |

Note
The above formulations contain 4 wt % cetyltrimethyl ammonium perchlorate.

D) Addition of Heterocyclic Liquid Crystals for Mixing

Figure 2A:
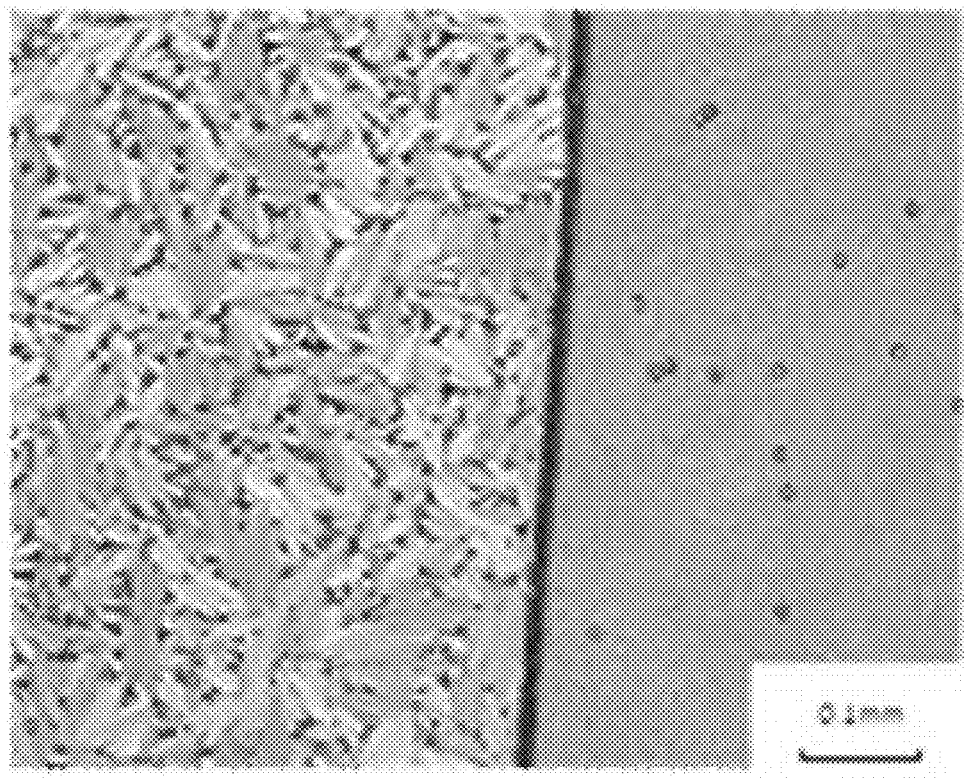
FIG. 2A shows the texture of a common smectic A phase mischcrystal.
Figure 2B:
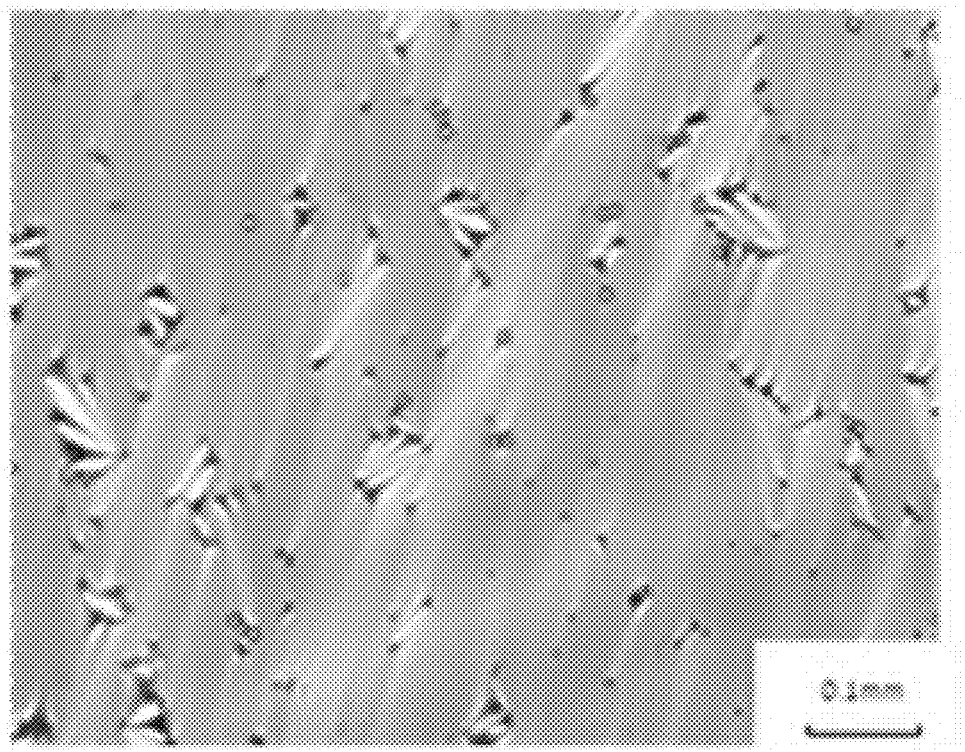
FIG. 2B shows the texture of a smectic A phase mischcrystal having large crystal domains obtained by mixing according to the present invention (shot by using a 10× objective lens).
Figure 3A:
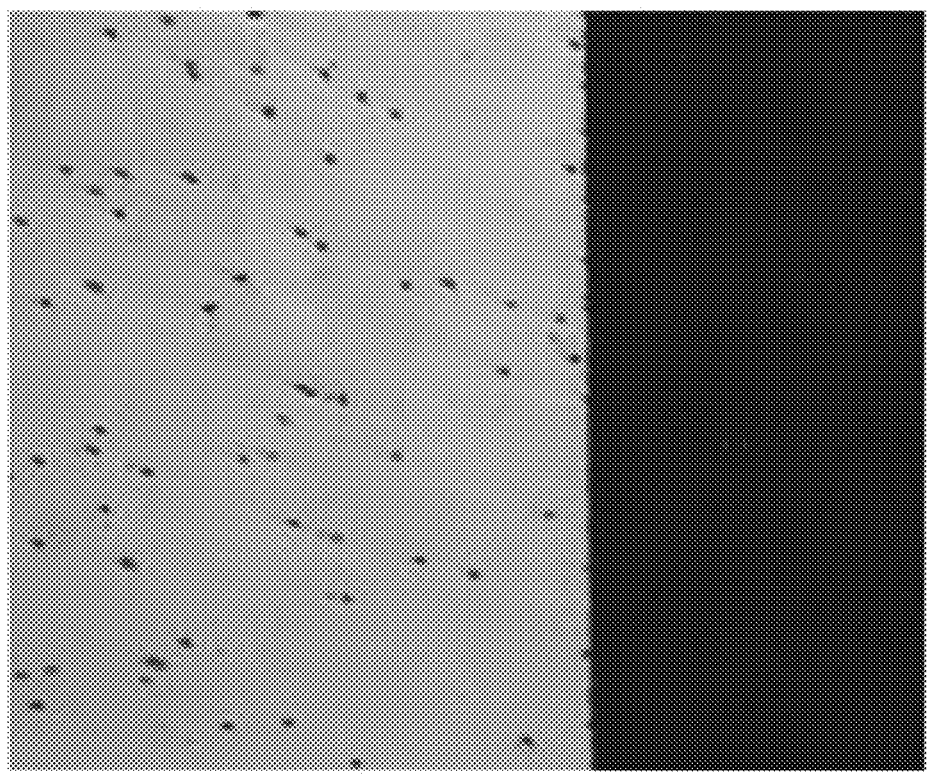
FIG. 3A and FIG. 3B are views of the textures of a non-smectic A phase mischcrystal obtained by mixing according to the present invention (shot by using a 10× objective lens).
Figure 3B:
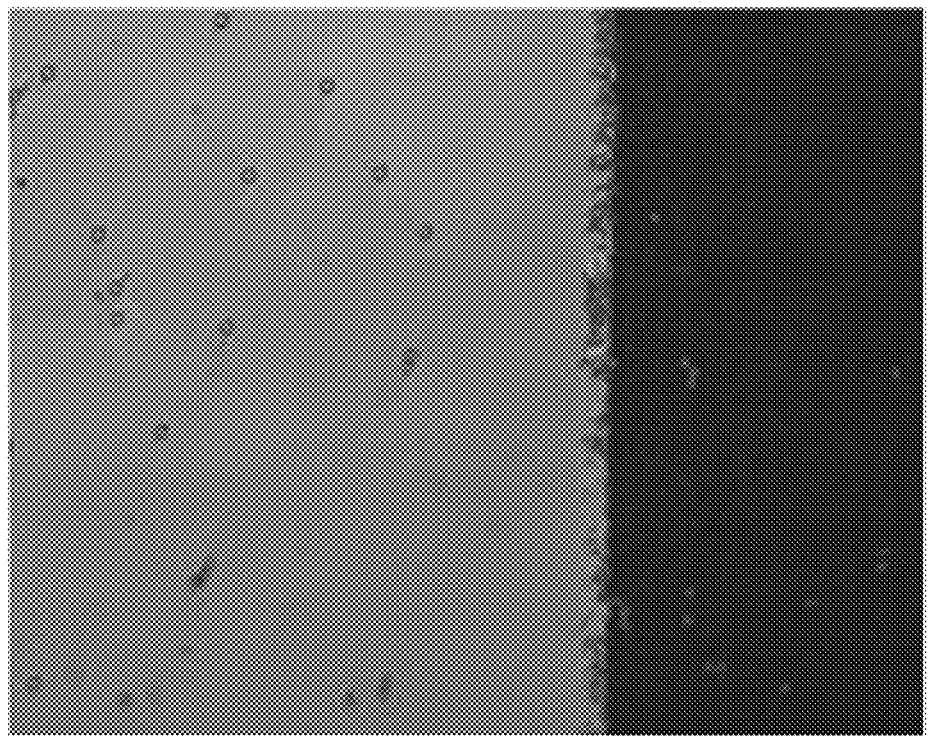

A heterocyclic liquid crystal generally has an optical anisotropy (Δn) higher than that of a liquid crystal having a similar structure. In the experiments of mixing smectic liquid crystals, it is found that when the liquid crystal monomer in the formulation is replaced by a heterocyclic liquid crystal having a similar structure, the contrast is significantly improved, with the specific experimental data shown in Table 6. It is found by analyses that, due to addition of some heterocyclic liquid crystals, small crystal domains in the focal conic texture of the smectic A phase become much larger, and it is found that the size of the crystal domains is 5 to 10 times larger than the size of the crystal domains of the common smectic A phase formulations through observation with a polarizing microscope. FIG. 2A shows the texture of the common smectic A phase mischcrystal. FIG. 2B shows the texture of the smectic A phase mischcrystal having compact arrangement of crystal domains obtained by mixing according to the present invention (shot by using a 10× objective lens). The contrast of the material according to the present invention is 9:1; and in some cases, even a contrast of 12:1 of other material having non-smectic A phases can be obtained, with the texture shown in FIG. 3A and FIG. 3B. Therefore, in order to significantly improve the contrast of the smectic liquid crystal formulations, the degree of order of molecular arrangement of the smectic liquid crystal needs to be improved, and the apparent appearance is that the optical texture of the smectic phase is more compact and the crystal domains are larger.

TABLE 6

Data of improvement of the contrast by heterocyclic liquid crystals

| Content in formulation (wt %) | | |
|---|---|---|
| 70% | 30% | Contrast |
| I102:8CB = 1:4 | 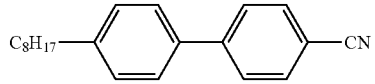 | 3:1 |
| | 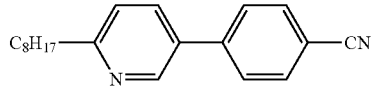 | 9:1 |
| | 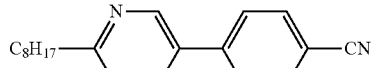 | 10:1 |
| | 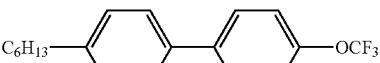 | 4:1 |
| | 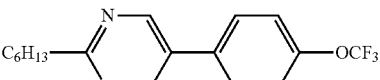 | 10:1 |

Note
The above formulations contain 4 wt % cetyltrimethyl ammonium perchlorate.

The methods for expanding the smectic A phase crystal domains or obtaining the non-smectic A phase textures by adding heterocyclic liquid crystals are not limited to addition of the materials having the above structures, and addition of heterocyclic liquid crystal materials having a structure other than the structures represented by the structural formulas above can also improve the contrast.

It is found through the tests above, the contrast can be improved by adding one or more of four materials below to the common smectic A, B, C, D, E, F, G, H or I phase liquid crystal materials, such as the smectic A phase materials (I102, 8CB).

a. Alkyne Liquid Crystals

Formula (III)

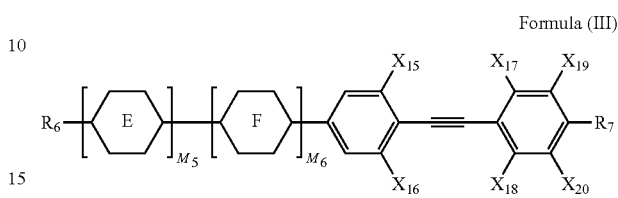

where $R_6$ is $C_1$-$C_{10}$ alkyl or $C_1$-$C_{10}$ alkoxy;
$R_7$ is CN, NCS or F.
E and F are independently selected from the group consisting of:

$X_{15}$ to $X_{20}$ are independently selected from the group consisting of: H and F.
$M_5$ and $M_6$ may independently be 0 or 1.

b. Heterocyclic Rings

Formula (IV)

where $R_8$ is $C_1$-$C_{10}$ alkyl or $C_1$-$C_{10}$ alkoxy;
$R_9$ is CN, NCS or F.
G and H are independently selected from the group consisting of:

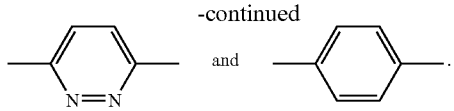

$X_{21}$ to $X_{22}$ are independently selected from the group consisting of: H and F.

$M_7$ and $M_8$ may independently be 0 or 1, and $M_7+M_8 \geq 1$.

c. Difluoro Ethers

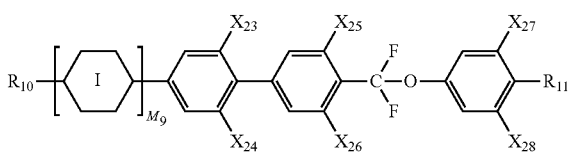

Formula (V)

where $R_{10}$ is $C_1$-$C_{10}$ alkyl or $C_1$-$C_{10}$ alkoxy;
$R_{11}$ is CN, NCS or F.

The ring structure I is selected from the group consisting of:

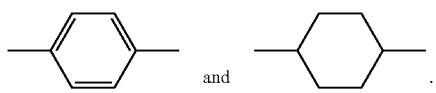

$X_{23}$ to $X_{28}$ are independently selected from the group consisting of: H and F.

$M_9$ may independently be 0 or 1.

d. Polycyclic Biphenyls

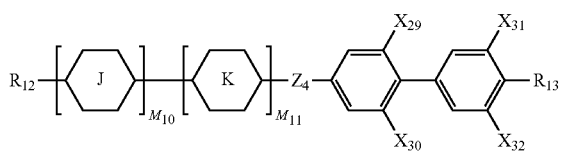

Formula (VI)

where $R_{12}$ is $C_1$-$C_{10}$ alkyl or $C_1$-$C_{10}$ alkoxy;
$R_{13}$ is CN, NCS or F.

The ring structure J and K are selected from the group consisting of:

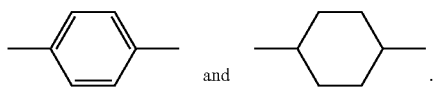

$Z_4$ is selected from the group consisting of: a single bond, —COO—, —$C_2H_4$— and

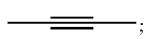;

$X_{29}$ to $X_{32}$ are independently selected from the group consisting of: H and F.

$M_{10}$ and $M_{11}$ may independently be 0 or 1.

4) Addition of Other Smectic Phases for Mixing

According to the molecular arrangement and texture, the smectic liquid crystals are classified into different phases, namely, the smectic A, B, C, D, E, F, G, H and I, where the smectic A phase has the lowest degree of order. It is found through a large number of experiments that when being mixed with the other smectic liquid crystals, the crystal domains of the smectic A phase are significantly expanded, and the contrast is improved; and in some cases, a smectic phase having a optical texture other than the smectic A phase may be obtained, and once the mischcrystal is changed into a non-smectic A phase, the contrast is significantly improved. The reason is that the liquid crystals with the other smectic phases have a relatively high degree of order, and the degree of order of the mischcrystal is increased by mixing with other materials. The basic method includes mixing the compounds of Formula (I) with the smectic B, C, D, E, F, G, H or I phase liquid crystal materials independently, and the smectic A, B, C, D, E, F, G, H and I phase mischcrystal materials, even some undefined new mischcrystal materials can be obtained by adjusting the ratio.

In addition, a mixture having a degree of order higher than that of the smectic A phase can be obtained by mixing the non-smectic A phase smectic liquid crystal material with some compounds having a length-diameter ratio, thereby achieving the purpose of improving the contrast.

In the present invention, the contrast of the smectic display devices is improved by modifying the optical texture of the common smectic A phase. The specific technical means include, but not limited to, mixing with the heterocyclic liquid crystals, and mixing with different smectic materials. The high scattering smectic liquid crystal material obtained in the present invention is a smectic A phase material or a mischcrystal material of the smectic B, C, D, E, F, G, H or I phase having a degree of order higher than that of the smectic A phase.

In the smectic liquid crystal display device, the high scattering smectic liquid crystal material of the present invention may be combined with a spacer, in some cases also with a polymer, to form a mixed liquid crystal layer of a smectic liquid crystal display. In the mixed liquid crystal layer formed by the high scattering smectic liquid crystal material of the present invention, the content of compound represented by Formula (I) is 1 wt % to 100 wt %, preferably 10 wt % to 100 wt %, based on the total weight of the mixed liquid crystal layer; the content of the ionic compounds, preferably such as cetyltrimethyl ammonium perchlorate, is 0.0001 wt % to 10 wt %, preferably 0.0001 wt % to 1 wt %, based on the total weight of the mixed liquid crystal layer.

The drive display principle of the smectic phase liquid crystal applied to display is shown in FIG. 1. The smectic liquid crystal display screen generally includes an upper base plate and a lower base plate coated with an electrode layered structure and a mixed smectic liquid crystal sandwiched between the upper base plate and the lower base plate, and the mixed liquid crystal layer is generally formed by mixing a smectic liquid crystal, a conductive material, a spacer and sometimes a polymer. A capacitor structure formed by crossed electrodes from the upper and lower base plates is connected to an external drive circuit so the capacitor can apply electric energy to the mixed liquid crystal layer between the base plates, wherein the applied waveform may be high-frequency drive pulse for clearing operation and low-frequency drive pulse for frosting operation.

In a low frequency electric field (≤100 Hz), long-chain conductive ions (the conductive material, such as added organic conductive ions, such as tetrabutylammonium bromide, sodium laurylsulfate, cetyltrimethyl ammonium perchlorate, and tetraphenylphosphonium iodide) begin to move back and forth under the electric field force, thereby agitating and disturbing the smectic layer in ordered arrangement. This behavior is similar to the dynamic scattering effect of the nematic liquid crystal, and difference lies in that, the vortex plane formed during the smectic dynamic scattering is perpendicular to the direction of the applied electric field, while the vortex plane formed during the dynamic scattering of the nematic liquid crystals is parallel to the direction of the applied electric field. The molecular arrangement of the smectic liquid crystal is kept in a disordered state as shown in the lower left panel of FIG. 1 due to the high viscosity of the smectic liquid crystal. At this time, when observing the liquid crystal cell by using the transmittance light from a microscope, it can be viewed that the electrode region is in a back state that shads light, resulting in a frosting state.

In high-frequency electric field (≥1000 Hz), the organic conductive ions move back and forth slightly, and the agitation effect on the liquid crystal is negligible. Herein, under the electric field force, the major axis of the liquid crystal molecules are oriented in parallel to the direction of the electric field; when the electric signal is stopped, this regular arrangement is maintained, as shown in the right side in the figure below. At this time, when observing the liquid crystal cell by using the transmittance light from a microscope, it can be viewed that the electrode region is in a bright state that light can transmit, resulting in a clearing state.

The molecular arrangement of the smectic liquid crystal can also remain in various states where the light transmittance is different, so as to achieve display at different grey levels. Therefore, the smectic liquid crystal may have the feature of multi-stable states.

The high scattering smectic material of the present invention can also be filled between two plastic films or two pieces of glass with a conductive layer and serving as a dimming medium, and can also be filled in vacuum into a lattice screen to serve as a display device.

In order to control the thickness of the liquid crystal cell, in the high scattering smectic material of the present invention, a spacer ball, a spacer rod made of polyester or polystyrene, or a glass material may be added; in order to reduce the working viscosity and improve the bonding firmness of the liquid crystal cell, a prepolymer may be added in the high scattering smectic material; and in order to achieve the effect of color display, a dichroic dye may be added in the high scattering smectic material.

The high scattering smectic material of the present invention is not limited to be used as a material in the dimming medium or a display device, and can be used in all the devices with a dual-frequency drive mode of low-frequency frosting and high-frequency clearing.

Advantages of the Present Invention

1. In the present invention, a new method for mixing the smectic liquid crystal material is used to obtain a series of smectic A phase liquid crystals having compact arrangement of crystal domains or a series of smectic liquid crystal mixed materials having a degree of order higher than that of the smectic A phase and an optical texture different from that of the smectic A phase, for example, the smectic B, H and G, and when being applied in a multi-stable smectic liquid crystal display pattern, this type of materials have a high scattering state.

2. When being applied to an existing smectic liquid crystal display, the mixed material of the present invention can effectively improve the contrast of the existing display. The contrast acceptable for human eyes is generally 5:1, and the high scattering smectic material provided by the present invention have a contrast of 6:1 to 12:1 without any optical processing aids, thereby providing good visual effects.

The present invention is further described below with reference to the accompanying drawings and specific embodiment, which are not intended to limit the scope of the present invention.

In the present invention, mixing and tests are performed following the following liquid crystal mixing experimental procedure:

1. selected materials are weighed at a specified ratio, and are added one by one into a glass vial;
2. the vial containing the materials is placed in an oven and heated until the liquid crystal is completely clear;
3. the liquid crystal is fully and uniformly mixed through ultrasonic shock or magnetic stirring;
4. the mixed liquid crystal is heated and filled into a liquid crystal cell having a thickness of 12 micrometers;
5. at a voltage of ±40 V, frosting is performed on the liquid crystal cell at a frequency of 30 Hz and clearing is performed at a frequency of 2 KHz, with all waves in the form of square waves; and
6. the liquid crystal cell was tested for the contrast.

The contrast of the smectic liquid crystal display is a ratio of the light transmittance at the clearing state to the light transmittance at the frosting state for the device, and in general, all materials have substantially the same light transmittance at the clearing state; therefore, the contrast mainly depends on the light transmittance of the material at the frosting state, that is, the scattering state of the smectic liquid crystal material.

Since no standard method for testing the contrast of the reflective smectic liquid crystal display device is available in the industry, multiple universal and simple methods are used to test the contrast, and finally, a test method having a visual effect closer to that of human eye is selected and used as the standard of verification and comparison.

Contrast Test Method: Microscopy Method

Figure 4:
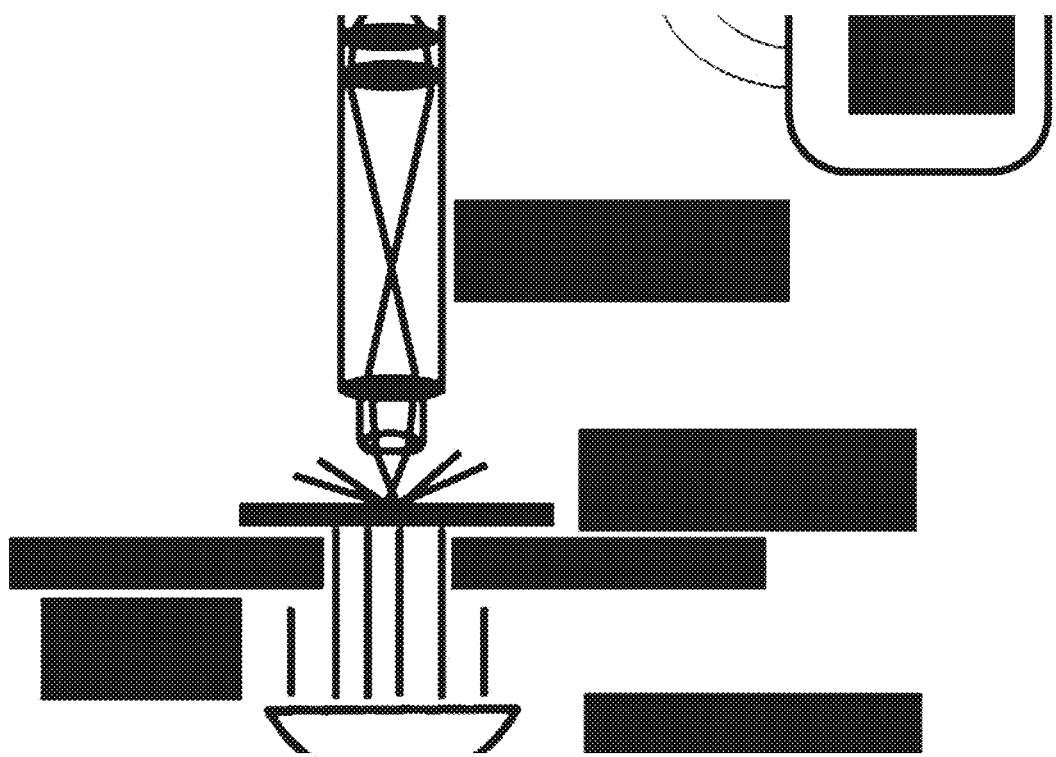
FIG. 4 is a schematic view of an instrument for testing the contrast by a microscopy method.

This test method is a simple method that is often used for testing and has measurement results close to human eyes, and the apparatus used by the method is shown in FIG. 4. In the microscopy method, a light transmittance measurement system HL-TT-MS is used as the contrast test apparatus, a DM_2500M metalloscope from Leica Corp. is used as the imaging device, an MV-VD120SC industrial CCD camera from Microvision Inc. is used as the optical signal collector, and HL-CR-11A software from Halation Photonics Co., Ltd. is used as the numerical calculation software.

Test Procedure:

1. A sample is placed on an objective table, and the focal length of the microscope is adjusted, so that the sample can be imaged clearly.
2. The sample was removed, and the HL-CR-11A software was used to compute with the numerical values at each points collected by CCD as follows:

$$Yi=0.299*R+0.587*G+0.114*B.$$

3. The Yi values at each points are summed to give a normalized factor $Y0=\Sigma Yi$.
4. The sample is placed onto the objective table, and the HL-CR-11A software is used to compute the Y value at this point $Y=\Sigma Yi$.
5. The transmittance of the sample is defined as $T=(Y/Y0)*100\%$.

6. For the smectic liquid crystal sample, the transmittance at clearing state Tc=(Yc/Y0)*100%, the transmittance at frosting state Ts=(Ys/Y0)*100%, and the contrast Cr=Tc/Ts.

In brief, first, in the situation that no liquid crystal cell is placed on the objective table and a light source (light ray emitted from a halide lamp equipped on the microscope) directly enter the objective lens, the light rays are collected by a receiver, the receiver converts the collected light rays into corresponding electric signals and send the electric signals to software of a computer, and the software records an electric signal B at this point as a basic reference value. Next, the luminance L of the light source at this point is fixed, the liquid crystal cell is placed on an objective table and the height of the objective table is adjusted, so that the liquid crystal cell can be clearly observed from an ocular lens; the receiver converts the light ray energy collected from the liquid crystal cells at the clearing state and the frosting state into an electric signal and sent the electrical signal to the computer. The computer software compares the light ray energy received at the clearing state and the frosting state with the basic reference. That is, the electric signal Q of the light ray energy received at the clearing state is divided by the basic reference value B to obtain a transmittance value QL at the clearing state, the electric signal M of the light ray energy received at the frosting state is divided by the basic reference value B to obtain a transmittance value ML at the frosting state, and the transmittance at the clearing state is divided by the transmittance at the frosting state to obtain a contrast value QL/ML*100%.

Embodiment 1

High Scattering Smectic A Phase Mischcrystal Having Large Crystal Domains Obtained by Using Heterocyclic Liquid Crystals

TABLE 7

Composition the mischcrystal of Embodiment 1

| Materials | Content, wt % |
|---|---|
| $C_6H_{13}$—[pyridine]—[phenyl]—NCS | 40 |
| $C_5H_{11}$—[phenyl]—[phenyl(F)]—NCS | 15 |
| $C_4H_9$—[cyclohexyl]—[phenyl]—[dioxaborinane]—[phenyl(F,F)] | 5 |
| $C_4H_9$—[cyclohexyl]—[phenyl]—[dioxane]—[phenyl]—$OC_5H_{11}$ | 10 |
| $C_4H_9$—[cyclohexyl]—[pyrimidine]—[dioxane]—[phenyl]—$CF_3$ | 5 |
| $C_5H_{11}$—[pyrimidine]—[phenyl]—[phenyl(F,F)] | 20 |
| [pentyl]—[phenyl]—[phenyl]—[phenyl]—CN | 4 |
| $H_2C=HC$—$(H_2C)_8$—[dioxane]—[phenyl]—$N^+$—$C_2H_5$  $Cl^-$ | 1 |

Figure 5:
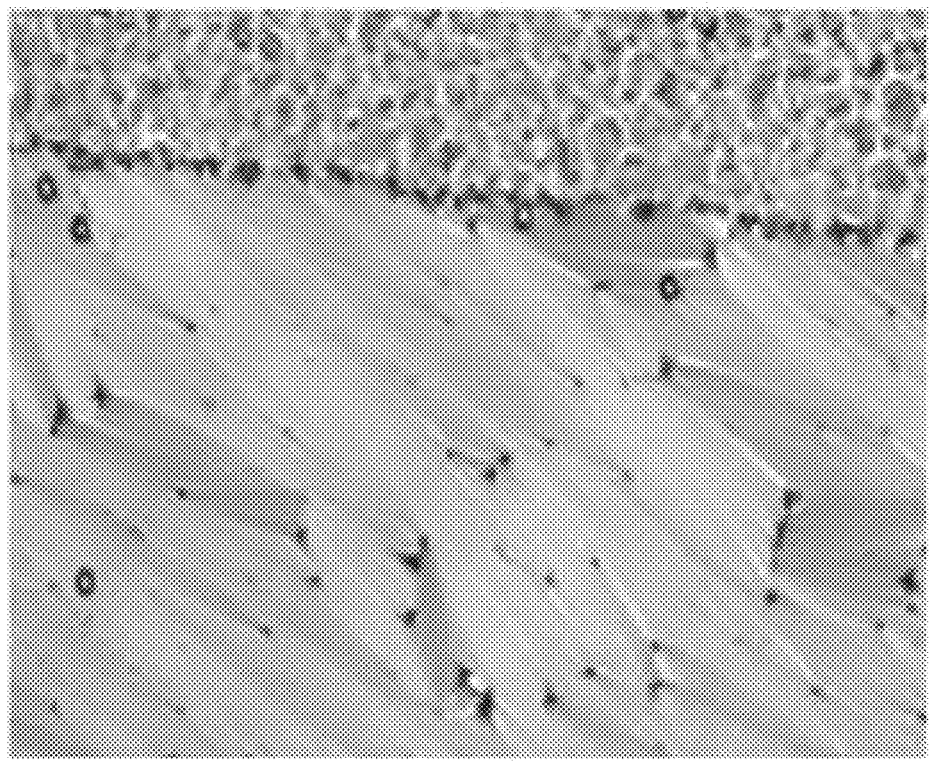
FIG. 5 is a view of the texture of a smectic A phase mischcrystal according to Embodiment 1 (shot by using a 10× objective lens).

The view of the texture of the mischcrystal in this embodiment is shown in FIG. 5 (shot by using a 10× objective lens). It is observed by using a microscope that, the texture is the smectic A phase, but has relatively large crystal domains that are arranged compactly, and has a good shading effect at the frosting state. The transmittance is tested as 90% at the clearing state and is merely 10% at the frosting state, so the contrast is 9:1.

Embodiment 2

High Scattering Non-Smectic A Phase Mischcrystal Obtained by Using Heterocyclic Liquid Crystals

TABLE 8

Composition of the mischcrystal of Embodiment 2

| Materials | Content, wt % |
|---|---|
| $C_6H_{13}$—[pyridine]—[difluorophenyl]—CN | 15 |
| $C_4H_9$—[pyridazine]—[phenyl]—NCS | 25 |
| $C_5H_{11}$—[spiro-dioxane-cyclohexane]—[phenyl]—CN | 5 |
| $C_9H_{19}$—[triazine]—[phenyl]—$OCF_3$ | 9.9 |
| $C_5H_{11}$—[dioxane]—[pyridine]—CN | 5 |
| $C_3H_7$—[phenyl]—[fluorophenyl]—[trifluorophenyl]—$CF_2O$—[fluorophenyl]—F | 15 |
| $C_3H_7$—[phenyl]—[fluorophenyl]—[phenyl]—CN | 20 |
| $C_8H_{17}$—[tetrazine]—[phenyl]—F | 5 |
| Tetrabutylammonium bromide | 0.1 |

According to the mixing method and the contrast test method in Embodiment 1, experiments are performed on the formulation in Table 8, and the following embodiment are the same.

Figure 6:
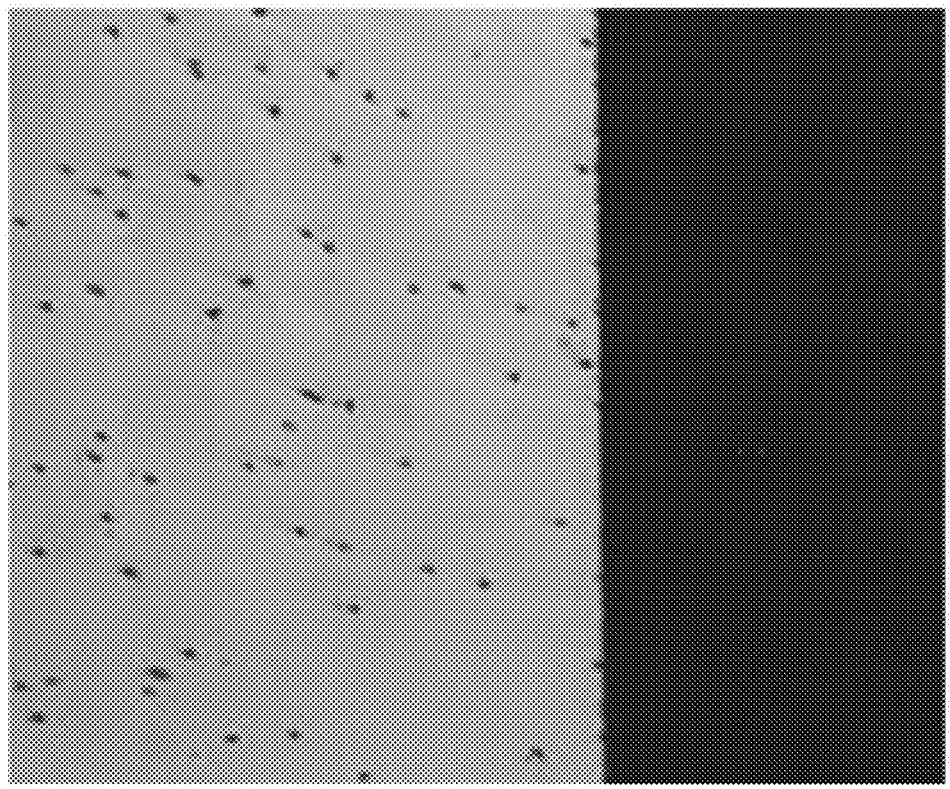
FIG. 6 is a view of the texture of a non-smectic A phase mischcrystal according to Embodiment 2 (shot by using a 10× objective lens).

As shown in FIG. 6, FIG. 6 is a view of the texture of the mischcrystal of this embodiment (shot by using a 10× objective lens). The texture is observed by using a microscope, definitely, the liquid crystal is not the smectic A phase liquid crystal, and it is judged that the mischcrystal is similar to that of the smectic B or H phase according to the texture. The crystal domains are changed from the smectic A needle shape to the irregular blocks shape and have a compact arrangement without any interstice therebetween, and a good shading effect is achieved at the frosting state. The transmittance is tested as 84% at the clearing state and is merely 7% at the frosting state, and the contrast is 12:1.

Embodiment 3

High Scattering Smectic B Phase Mischcrystal Obtained by Using the Smectic B Phase for Mixing

TABLE 9

Composition of the mischcrystal of Embodiment 3

| Materials | Content, wt % |
|---|---|
| [structure: heptyl-biphenyl-CN] | 20 |
| [structure: $C_4H_9$-cyclohexyl-phenyl-COO-tetrafluorobiphenyl-$OCH_3$] | 5 |
| [structure: $C_8H_{17}$-indane-phenyl-CN] | 5 |
| [structure: $C_5H_{11}$-cyclohexyl-phenyl-$C_2H_4$-fluorophenyl-$OCHF_2$] | 5 |
| [structure: $C_3H_7$-cyclohexyl-cyclohexyl-phenyl-$CF_3$] | 10 |
| [structure: $C_5H_{11}$-cyclohexyl-phenyl-difluorophenyl] | 10 |
| [structure: $H_3C$-Si(CH$_3$)$_2$-O-Si(CH$_3$)$_2$-O-Si(CH$_3$)$_2$-$C_{10}H_{20}$O-phenyl-phenyl-phenyl-CN] | 19.9 |
| [structure: $C_6H_{13}$O-biphenyl-$C_6H_{13}$] | 25 |
| Phenyltriethylammonium iodide | 0.1 |

The texture is observed by using a microscope, and the liquid crystal is the smectic B liquid crystal, has compact arrangement of crystal domains, and has a good shading effect at the frosting state. The transmittance is tested as 90% at clearing state and is merely 9% at the frosting state, and the contrast is 10:1.

Embodiment 4

High Scattering Smectic C Phase Mischcrystal Obtained by Using the Smectic C Phase for Mixing

TABLE 10

Composition of the mischcrystal of Embodiment 4

| Materials | Content, wt % |
|---|---|
| 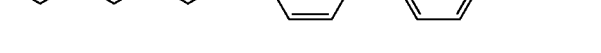 | 20 |
|  | 10 |
| 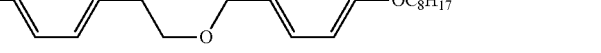 | 5 |
|  | 5 |
|  | 10 |
| 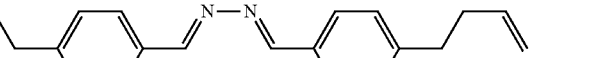 | 5 |
|  | 19.9 |
| 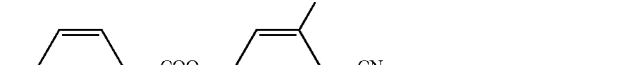 | 25 |
| Tetraethylamine p-toluenesulfonate | 0.1 |

The texture is observed by using a microscope, and the liquid crystal is the smectic C liquid crystal, has compact arrangement of crystal domains, and has a good shading effect at the frosting state. The transmittance is tested as 90% at the clearing state and is merely 10% at the frosting state, and the contrast is 9:1.

Embodiment 5

High Scattering Smectic D Phase Mischcrystal Obtained by Using the Smectic D Phase for Mixing

TABLE 11

Composition of the mischcrystal of Embodiment 5

| Materials | Content, wt % |
|---|---|
| 4'-octyl-4-cyanobiphenyl (C8H17–C6H4–C6H4–CN) | 20 |
| C3H7–C6H4–C6H3F–C6H3F–CF2–O–C6H2F3 | 5 |
| C10H21–pyridine–C6H4–NCS | 10 |
| C2H5–C6H4–C6H3F–C6H2F3 | 5 |
| C3H7–C6H4–C6H4–C≡C–C6H2F2–OC2H5 | 5 |
| C2H5–C6H4–C6H4–C≡C–C6H2F2–C3H7 | 10 |
| C6H13–benzothiazole–C6H2F3 | 5 |
| H3C–(CH2)12–O–C6H4–C6H4–CN | 14.9 |
| C16H33O–C6H3(NO2)–C6H4–COOH | 25 |
| Bis(tetra-n-butyl-amine)bis(1,3-dithiole-2-thione-4,5-dithiolato)palladium(II) | 0.1 |

The texture is observed by using a microscope, and the liquid crystal is the smectic D liquid crystal, has compact arrangement of crystal domains, and has a good shading effect at frosting state. The transmittance is tested as 90% at the clearing state and is merely 9% at the frosting state, and the contrast is 10:1.

Embodiment 6

High Scattering Smectic E Phase Mischcrystal Obtained by Using the Smectic E Phase for Mixing

TABLE 12

Composition of the mischcrystal of Embodiment 6

| Materials | Content, wt % |
|---|---|
| $C_8H_{17}$—C6H4—C6H4—CN | 20 |
| $C_6H_{13}$-pyridine-C6H2(F)(F)—NCS | 5 |
| $C_6H_{13}$-pyridine-C6H3(F)—NCS | 10 |
| $C_5H_{11}$—cyclohexyl—C6H4—C≡C—C6H4—$C_2H_5$ | 5 |
| $C_5H_{11}$—cyclohexyl—cyclohexyl—$C_2H_4$—C6H4—$OC_2H_5$ | 10 |
| $H_3C$—Si(CH$_3$)$_2$—O—Si(CH$_3$)$_2$—O—Si(CH$_3$)$_2$—$C_{10}H_{20}$—C6H4—C6H4—C6H4—CN | 5 |
| $H_3C$—(CH$_2$)$_{12}$—O—C6H4—C6H4—CN | 19.9 |
| $C_2H_5O$—C6H4—C6H4—COCH$_3$ | 25 |
| Bis(tetra-n-butylammonium)tetracyanodiphenoquinodimethane | 0.1 |

The texture is observed by using a microscope, and the liquid crystal is the smectic E liquid crystal, has compact arrangement of crystal domains, and has a good shading effect at the frosting state. The transmittance is tested as 90% at the clearing state and is merely 9% at the frosting state, and the contrast is 10:1.

Embodiment 7

High Scattering Smectic F Phase Mischcrystal Obtained by Using the Smectic F Phase for Mixing

TABLE 13

| Composition of the mischcrystal of Embodiment 7 | |
|---|---|
| Materials | Content, wt % |
| $C_8H_{17}$—C$_6H_4$—C$_6H_4$—CN | 20 |
| (CH$_3$)$_3$Si—O—Si(CH$_3$)$_2$—(CH$_2$)$_{10}$—O—C$_6H_4$—C$_6H_4$—CN | 15 |
| $C_6H_{13}$—C$_6H_4$—C$_6H_4$—NCS | 10 |
| $C_3H_7$—pyrimidine—C$_6H_3$(F)—pyrimidine—$C_4H_9$ | 5 |
| CH$_2$=CH—$C_2H_4$—C$_6H_4$—C≡C—C$_6H_4$—$C_2H_4$—CH=CH$_2$ | 5 |
| $C_5H_{11}$—C$_6H_4$—C≡C—C$_6H_4$—OCH$_3$ | 10 |
| $C_5H_{11}$—cyclohexyl—C$_6H_4$—C$_6H_2$F$_3$ | 9.9 |
| $C_9H_{19}O$—C$_6H_4$—CH=N—C$_6H_4$—$C_4H_9$ | 25 |
| Cetylammonium perchlorate | 0.1 |

The texture is observed by using a microscope, and the liquid crystal is the smectic F liquid crystal, has compact arrangement of crystal domains, and has a good shading effect at the frosting state. The transmittance is tested as 90% at the clearing state and is merely 9% at the frosting state, and the contrast is 10:1.

Embodiment 8
High Scattering Smectic G Phase Mischcrystal Obtained by Using the Smectic G Phase for Mixing

TABLE 14

Composition of the mischcrystal of Embodiment 8

| Materials | Content, wt % |
|---|---|
| 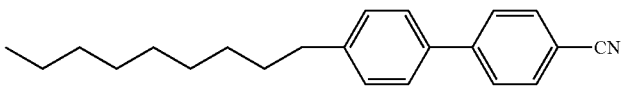 [SMILES: CCCCCCCCCc1ccc(-c2ccc(C#N)cc2)cc1] | 20 |
| 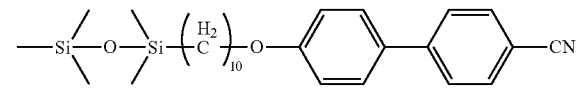 | 15 |
| 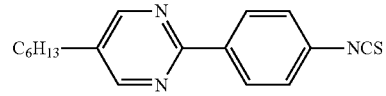 | 10 |
| 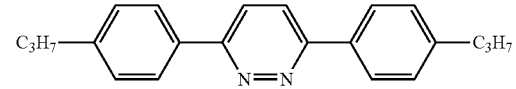 | 5 |
| 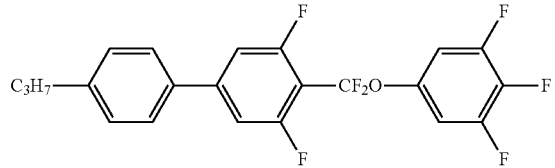 | 5 |
| 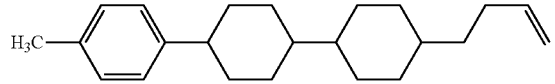 | 5 |
| 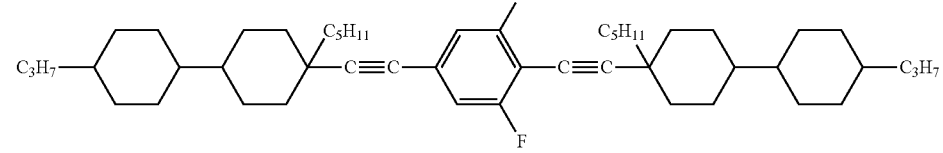 | 5 |
| 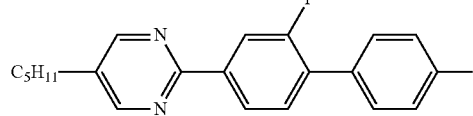 | 9.9 |
| 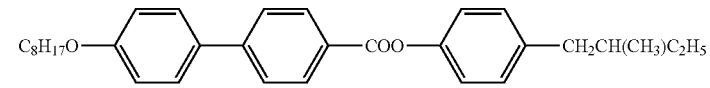 | 25 |
| Cetyl tetraammonium bromide | 0.1 |

The texture is observed by using a microscope, and the liquid crystal is the smectic G liquid crystal, has compact arrangement of crystal domains, and has a good shading effect at the frosting state. The transmittance is tested as 90% at the clearing state and is merely 9% at the frosting state, and the contrast is 10:1.

Embodiment 9

High Scattering Smectic H Phase Mischcrystal Obtained by Using the Smectic H Phase for Mixing

TABLE 15

| Composition of the mischcrystal of Embodiment 9 | |
|---|---|
| Materials | Content, wt % |
| [structure] | 20 |
| [structure] | 15 |
| [structure] | 5 |
| [structure] | 5 |
| [structure] | 5 |
| [structure] | 5 |
| [structure] | 19.9 |
| [structure] | 25 |
| 1-octyl-3-methylimidazole hexafluorophosphate | 0.1 |

The texture is observed by using a microscope, and the liquid crystal is the smectic H liquid crystal, has compact arrangement of crystal domains, and has a good shading effect at the frosting state. The transmittance is tested as 90% at the clearing state and is merely 9% at the frosting state, and the contrast is 10:1.

Embodiment 10

High Scattering Smectic I Phase Mischcrystal Obtained by Using the Smectic I Phase for Mixing

TABLE 16

Composition of the mischcrystal of Embodiment 10

| Materials | Content, wt % |
|---|---|
| C8H17—C6H4—C6H4—CN | 20 |
| Siloxane-(CH2)10-O-C6H4-C6H4-CN | 15 |
| C5H11—Cy—COO—CH(Ph)—CH2—OOC—Cy—C5H11 | 5 |
| C5H11—bicyclo—C6H4—C6H2F2—O—CH(CH3)(C6H13) | 5 |
| C4H9—Py—C6H4—NCS | 5 |
| Binaphthyl: NC-naphth(OC10H21)-naphth(OC10H21)-CN | 5 |
| C5H11—C6H4—C6H2F2—NCS | 19.9 |
| C18H37HN—C6H4—C6H4—NHC18H37 | 25 |
| Bis(tetra-n-butylammonium)tetracyanodiphenoquinodimethane | 0.1 |

The texture is observed by using a microscope, and the liquid crystal is the smectic I liquid crystal, has compact arrangement of crystal domains, and has a good shading effect at the frosting state. The transmittance is tested as 90% at the clearing state and is merely 9% at the frosting state, and the contrast is 10:1.

Embodiment 11

High Scattering Undefined Smectic Phase Mischcrystal Obtained by Using Various Smectic Liquid Crystal Materials for Mixing

TABLE 17

Composition of the mischcrystal of Embodiment 11

| Materials | Content, wt % |
|---|---|
| 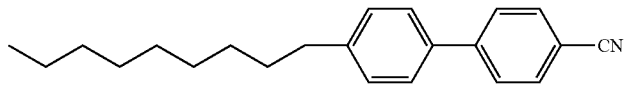 [SMILES: CCCCCCCCCc1ccc(-c2ccc(C#N)cc2)cc1] | 20 |
| 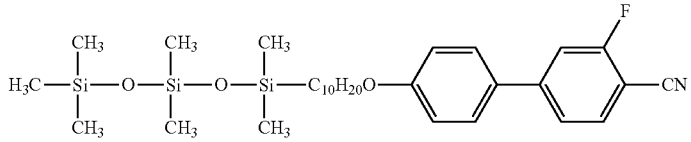 | 24 |
| 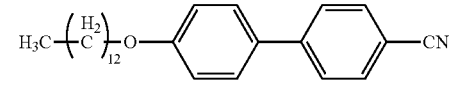 | 5.9 |
| 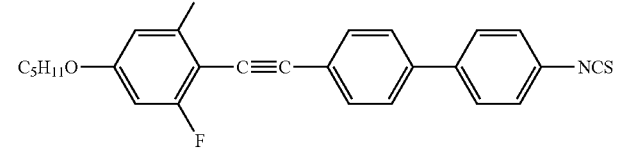 | 5 |
| 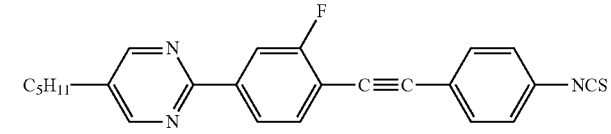 | 5 |
| 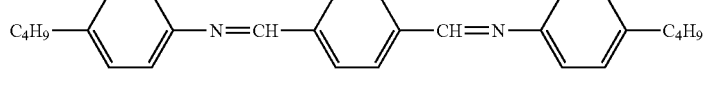 | 10 |
| 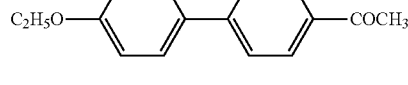 | 12 |
| 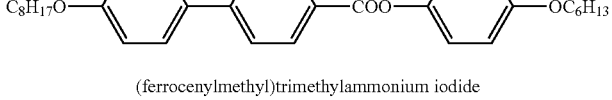 | 18 |
| (ferrocenylmethyl)trimethylammonium iodide | 0.1 |

Figure 7:
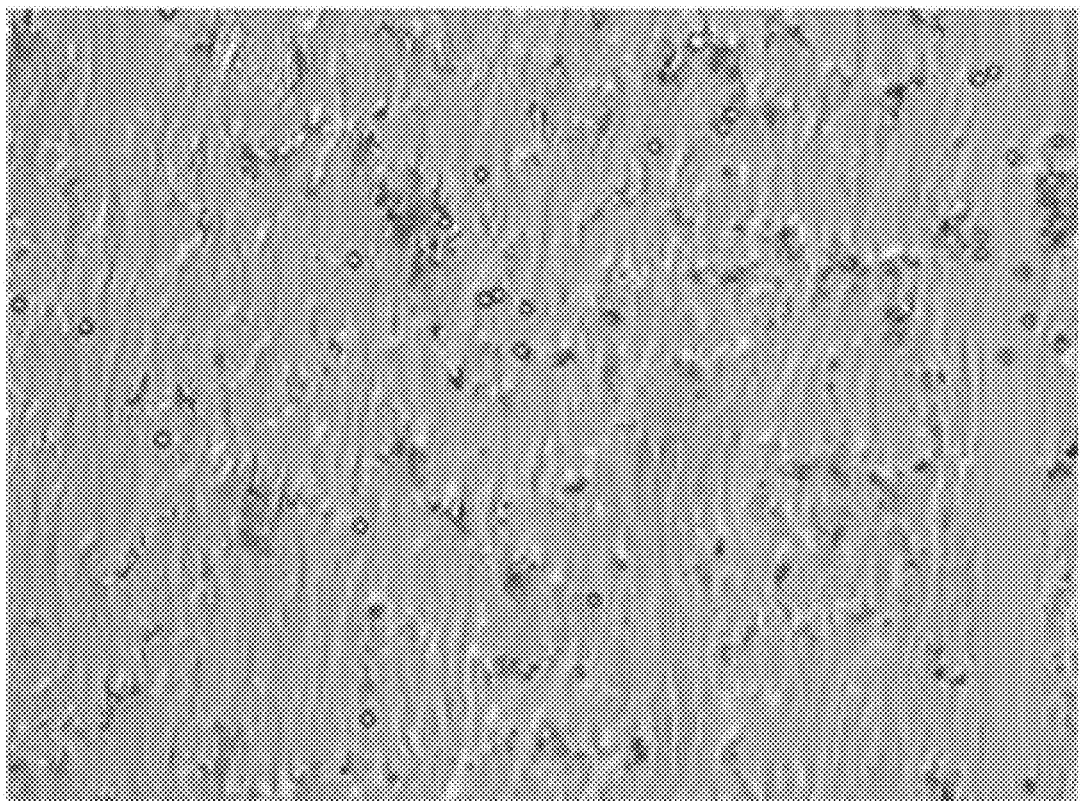
FIG. 7 is a view of the texture of a mischcrystal according to Embodiment 11 (shot by using a 10× objective lens).

FIG. 7 is a view of the texture of the mischcrystal of Embodiment 11 (shot by using a 10× objective lens). The texture is observed as water-like texture by using a microscope, and the liquid crystal is an undefined smectic phase, has compact arrangement of crystal domains, and has a good shading effect at the frosting state. The transmittance is tested as 90% at the clearing state and is merely 9% at the frosting state, and the contrast is 10:1.

Embodiment 12

High Scattering Mixed Liquid Crystal Material Obtained by Using the Alkyne Liquid Crystals

TABLE 18

| Composition of the mischcrystal of Embodiment 12 | |
|---|---|
| Materials | Content, wt % |
| CH₃(CH₂)₇—C₆H₄—C₆H₄—CN | 54.9 |
| (CH₃)₃Si—O—Si(CH₃)₂—C₁₀H₂₀O—C₆H₄—C₆H₄—CN | 20 |
| C₅H₁₁-cyclohexyl-(2-F-phenyl)-phenyl-bicyclopentyl-C₅H₁₁ | 10 |
| C₈H₁₇—C₆H₄—C≡C—(3-F-C₆H₃)—NCS | 5 |
| C₅H₁₁—C₆H₄—C≡C—C₆H₄—OCF₃ | 5 |
| C₅H₁₁—C₆H₄—C≡C—C₆H₄—CN | 5 |
| Cetyltrimethylammonium perchlorate | 0.1 |

The transmittance is tested as 90% at the clearing state and is 15% at the frosting state, and the contrast is 6:1.

Embodiment 13

High Scattering Mixed Liquid Crystal Material Obtained by Using Cyanoterphenyl Liquid Crystals

TABLE 19

| Composition of the mischcrystal of Embodiment 13 | |
|---|---|
| Materials | Content, wt % |
| CH₃(CH₂)₇—C₆H₄—C₆H₄—CN | 44.9 |
| (CH₃)₃Si—O—Si(CH₃)₂—C₁₀H₂₀O—C₆H₄—C₆H₄—CN | 20 |

TABLE 19-continued

| Composition of the mischcrystal of Embodiment 13 | |
|---|---|
| Materials | Content, wt % |
| 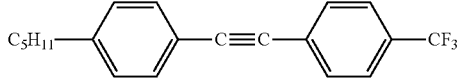 | 5 |
| 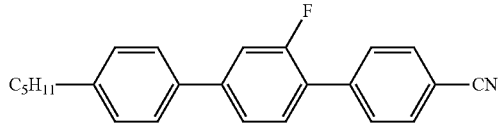 | 5 |
| 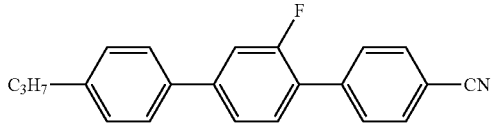 | 5 |
| 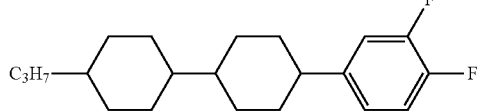 | 15 |
| 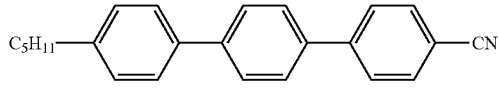 | 5 |
| Cetyltriethylammonium bromide | 0.1 |

The transmittance is tested as 90% at the clearing state and is 15% at the frosting state, and the contrast is 6:1.

Embodiment 14

High Scattering Mixed Liquid Crystal Material Obtained by Using Polycyclic Materials for Mixing

TABLE 20

| Composition of the mischcrystal of Embodiment 14 | |
|---|---|
| Materials | Content, wt % |
| 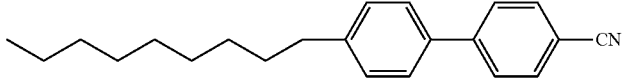 | 34 |
| 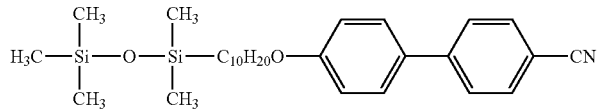 | 10 |
| 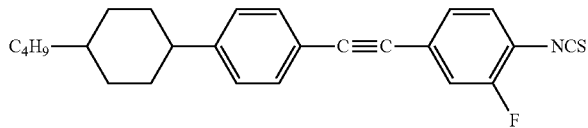 | 5 |

TABLE 20-continued

Composition of the mischcrystal of Embodiment 14

| Materials | Content, wt % |
|---|---|
| 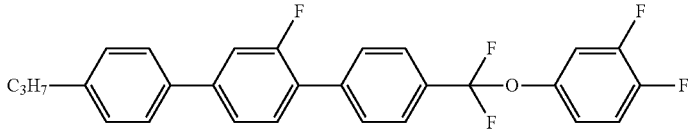 | 5 |
| 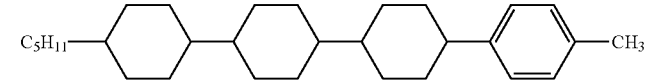 | 5 |
| 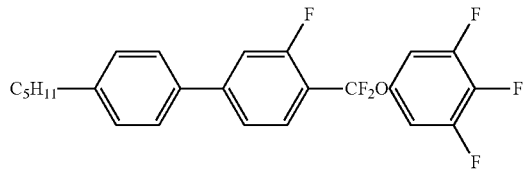 | 15 |
| 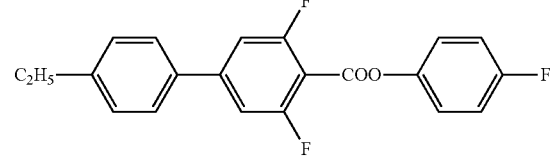 | 5 |
| 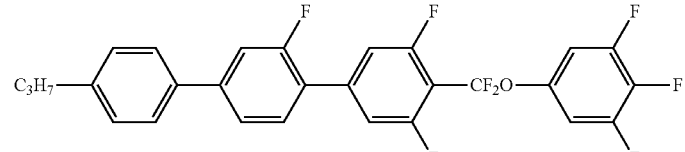 | 20 |
| 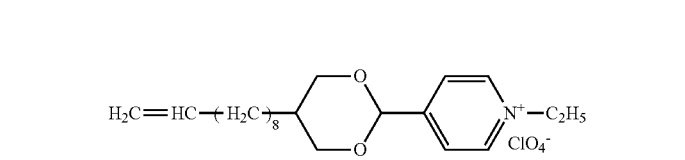 | 1 |

The transmittance is tested as 88% at the clearing state and is 11% at the frosting state, and the contrast is 8:1.

Embodiment 15

High Scattering Mischcrystal Obtained by Adding Compounds of Formula (III) to the Common Smectic A Phase Materials

TABLE 21

Composition of the mischcrystal of Embodiment 15

| Materials | Content, wt % |
|---|---|
| 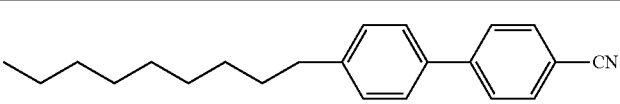 | 54.9 |

TABLE 21-continued

| Composition of the mischcrystal of Embodiment 15 | |
|---|---|
| Materials | Content, wt % |
| 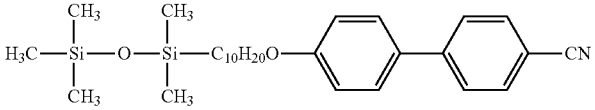 | 30 |
| 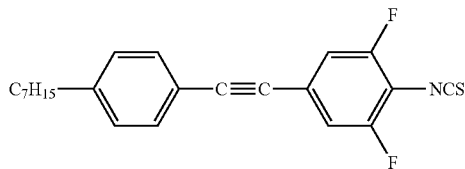 | 5 |
| 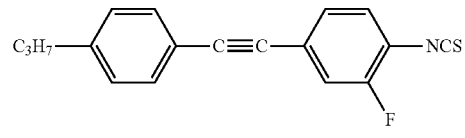 | 5 |
| 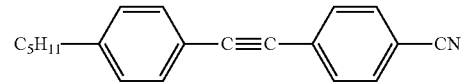 | 5 |
| Cetyltrimethylammonium perchlorate | 0.1 |

The transmittance is tested as 90% at the clearing state and is 15% at the frosting state, and the contrast is 6:1.

Embodiment 1

High Scattering Mischcrystal Obtained by Adding Compounds of Formula (IV) to the Common Smectic A Phase Materials

TABLE 22

| Composition of the mischcrystal of Embodiment 16 | |
|---|---|
| Materials | Content, wt % |
| 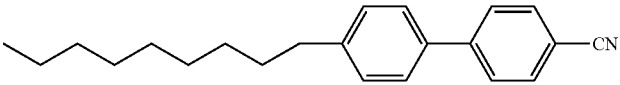 [SMILES: CCCCCCCCCc1ccc(-c2ccc(C#N)cc2)cc1] | 54.9 |
| 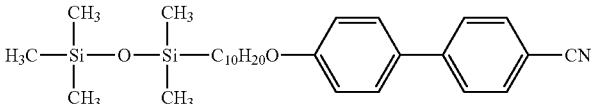 | 30 |
| 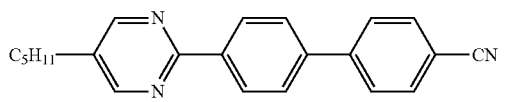 | 5 |
| 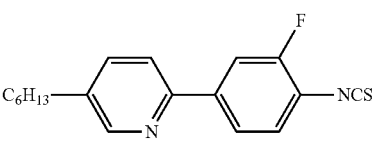 | 5 |

TABLE 22-continued

Composition of the mischcrystal of Embodiment 16

| Materials | Content, wt % |
|---|---|
| 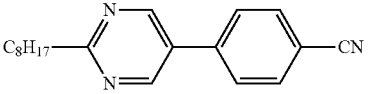 C$_8$H$_{17}$— pyrimidine —C$_6$H$_4$—CN | 5 |
| Cetyltrimethylammonium perchlorate | 0.1 |

The transmittance is tested as 90% at the clearing state and is 15% at the frosting state, and the contrast is 6:1.

Embodiment 17

High Scattering Mischcrystal Obtained by Adding Compounds of Formula (V) to the Common Smectic A Phase Materials

TABLE 23

Composition of the mischcrystal of Embodiment 17

| Materials | Content, wt % |
|---|---|
| 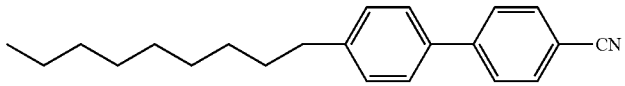 [SMILES: CCCCCCCCCc1ccc(-c2ccc(C#N)cc2)cc1] octyl-biphenyl-CN | 54.9 |
| 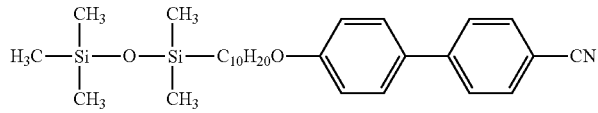 siloxane-C$_{10}$H$_{20}$O-biphenyl-CN | 30 |
| 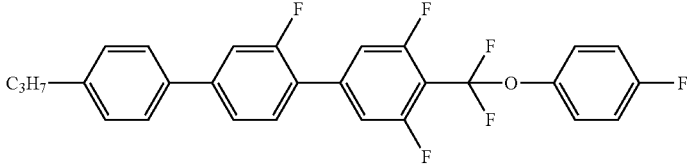 C$_3$H$_7$-terphenyl-CF$_2$O-phenyl fluorinated | 5 |
| 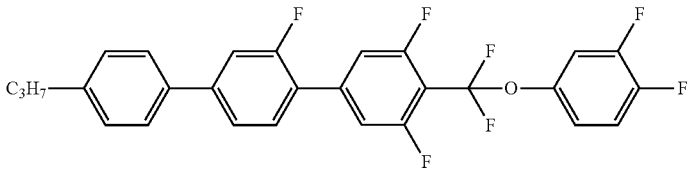 C$_3$H$_7$-terphenyl-CF$_2$O-phenyl fluorinated | 5 |
| 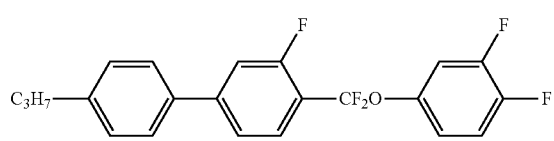 C$_3$H$_7$-biphenyl-CF$_2$O-phenyl fluorinated | 5 |
| Cetyltrimethylammonium perchlorate | 0.1 |

The transmittance is tested as 90% at the clearing state and is 15% at the frosting state, and the contrast is 6:1.

Embodiment 18

High Scattering Mischcrystal Obtained by Adding Compounds of Formula (VI) to the Common Smectic A Phase Materials

TABLE 24

Composition of the mischcrystal of Embodiment 18

| Materials | Content, wt % |
|---|---|
| C$_8$H$_{17}$—C$_6$H$_4$—C$_6$H$_4$—CN (4-cyano-4'-octylbiphenyl) | 54.9 |
| (CH$_3$)$_3$Si—O—Si(CH$_3$)$_2$—C$_{10}$H$_{20}$O—C$_6$H$_4$—C$_6$H$_4$—CN | 30 |
| C$_3$H$_7$—Cy—Cy—Ph—Ph—NCS | 5 |
| C$_8$H$_{17}$—Cy—Ph—COO—Ph—Ph—CN | 5 |
| C$_3$H$_7$—Cy—Cy—Ph—Ph(3,4,5-triF) | 5 |
| Cetyltrimethylammonium perchlorate | 0.1 |

The transmittance is tested as 90% at the clearing state and is 15% at the frosting state, and the contrast is 6:1.

Embodiment 19

High Scattering Mischcrystal Obtained by Using any Combination of The Common Smectic A Phase Materials with Compounds of Formula (III), (IV), (V) and (VI)

TABLE 25

Composition of the mischcrystal of Embodiment 19

| Materials | Content, wt % |
|---|---|
| C$_8$H$_{17}$—C$_6$H$_4$—C$_6$H$_4$—CN | 54.9 |
| (CH$_3$)$_3$Si—O—Si(CH$_3$)$_2$—C$_{10}$H$_{20}$O—C$_6$H$_4$—C$_6$H$_4$—CN | 30 |

TABLE 25-continued

| Composition of the mischcrystal of Embodiment 19 ||
| Materials | Content, wt % |
|---|---|
| 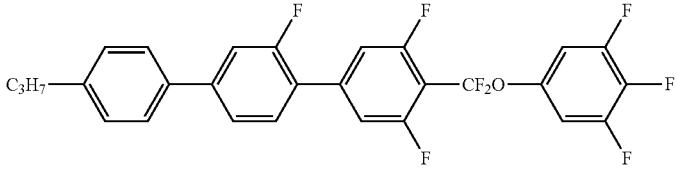 | 5 |
| 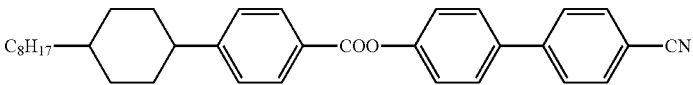 | 5 |
| 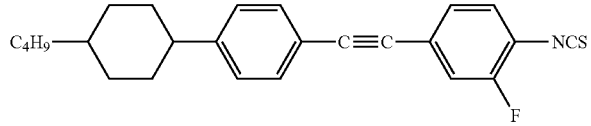 | 5 |
| Cetyltrimethylammonium perchlorate | 0.1 |

The transmittance is tested as 90% at the clearing state and is 15% at the frosting state, and the contrast is 6:1.

Embodiment 20

High Scattering Mischcrystal Obtained by Using any Combination of The Common Smectic A Phase Materials with Compounds of Formula (III), (IV), (V) and (VI)

TABLE 26

| Composition of the mischcrystal of Embodiment 20 ||
| Materials | Content, wt % |
|---|---|
| 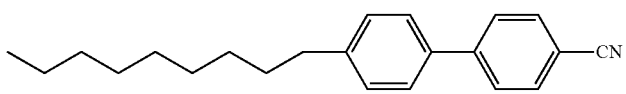 [SMILES: CCCCCCCCCc1ccc(-c2ccc(C#N)cc2)cc1] | 54.9 |
| 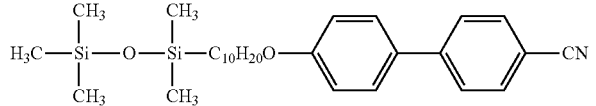 | 30 |
| 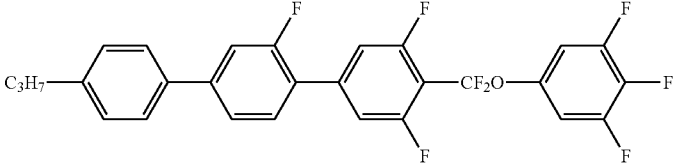 | 5 |
| 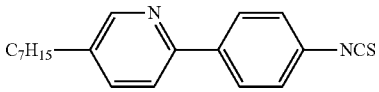 | 5 |

TABLE 26-continued

Composition of the mischcrystal of Embodiment 20

| Materials | Content, wt % |
|---|---|
|  $C_7H_{15}$—⟨⟩—C≡C—⟨⟩—CN | 5 |
| Cetyltrimethylammonium perchlorate | 0.1 |

The transmittance is tested as 90% at the clearing state and is 15% at the frosting state, and the contrast is 6:1.

Figure 8:
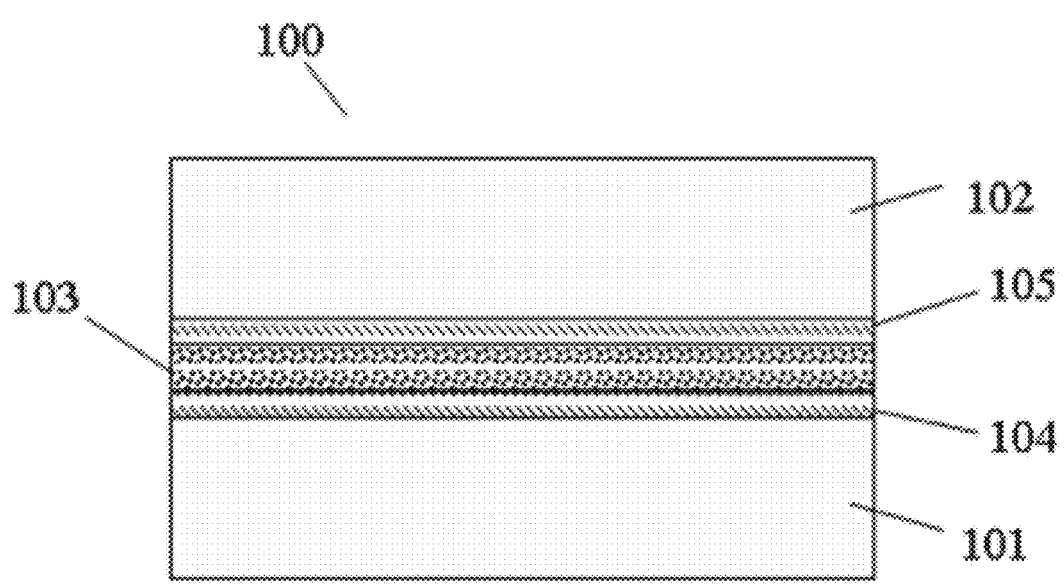
FIG. 8 is a schematic view of a display layer of a smectic liquid crystal display module.

Application of the High Scattering Smectic Liquid Crystal Material of the Present Invention in Display A display device that uses a high scattering smectic material mainly includes a display layer, as shown in FIG. 8. The display layer includes a first base layer, a second base layer, and a mixed layer containing the above high scattering smectic material disposed between the first base layer and the second base layer. The first base layer is provided with a first conductive electrode layer on a side facing the mixed layer, the second base layer is provided with a second conductive electrode layer on a side facing the mixed layer, and the first conductive electrode layer and the second conductive electrode layer independently include M electrodes and N electrodes (M,N≥1), and a pixel matrix for displaying a static image is formed between the M electrodes and the N electrodes.

In general, the display layer is provided with a back layer on the back; in order to achieve color display, a color film is provided between the display layer and the back layer; in order to optimize the optical structure of the display, a light enhancing layer is provided between the display layer and the back layer, and the light enhancing layer includes a light enhancing base plate and a light enhancing member.

The light enhancing base plate is a high molecular film or glass; and the light enhancing member is a light enhancing film or prism structure.

The light enhancing member may be disposed on a surface of the light enhancing base plate facing the display layer and/or the back layer, or may be disposed on a surface of the first base layer facing the light enhancing layer or/and on a surface of the second base layer facing the light enhancing layer.

The light enhancing layer is designed to reflect and refract the light incident into the display multiple times, to increase the number of times and the amount of the light incident into the display layer, so that more light is refracted in the portion of the display layer corresponding to the pixel points that are required for displaying in the frosting state, thereby improving the scattering effect and enhancing the luminance at the pixels in the frosting state, and significantly improving the contrast between the pixels in the frosting state and the pixels in the full clearing state.

Figure 9:
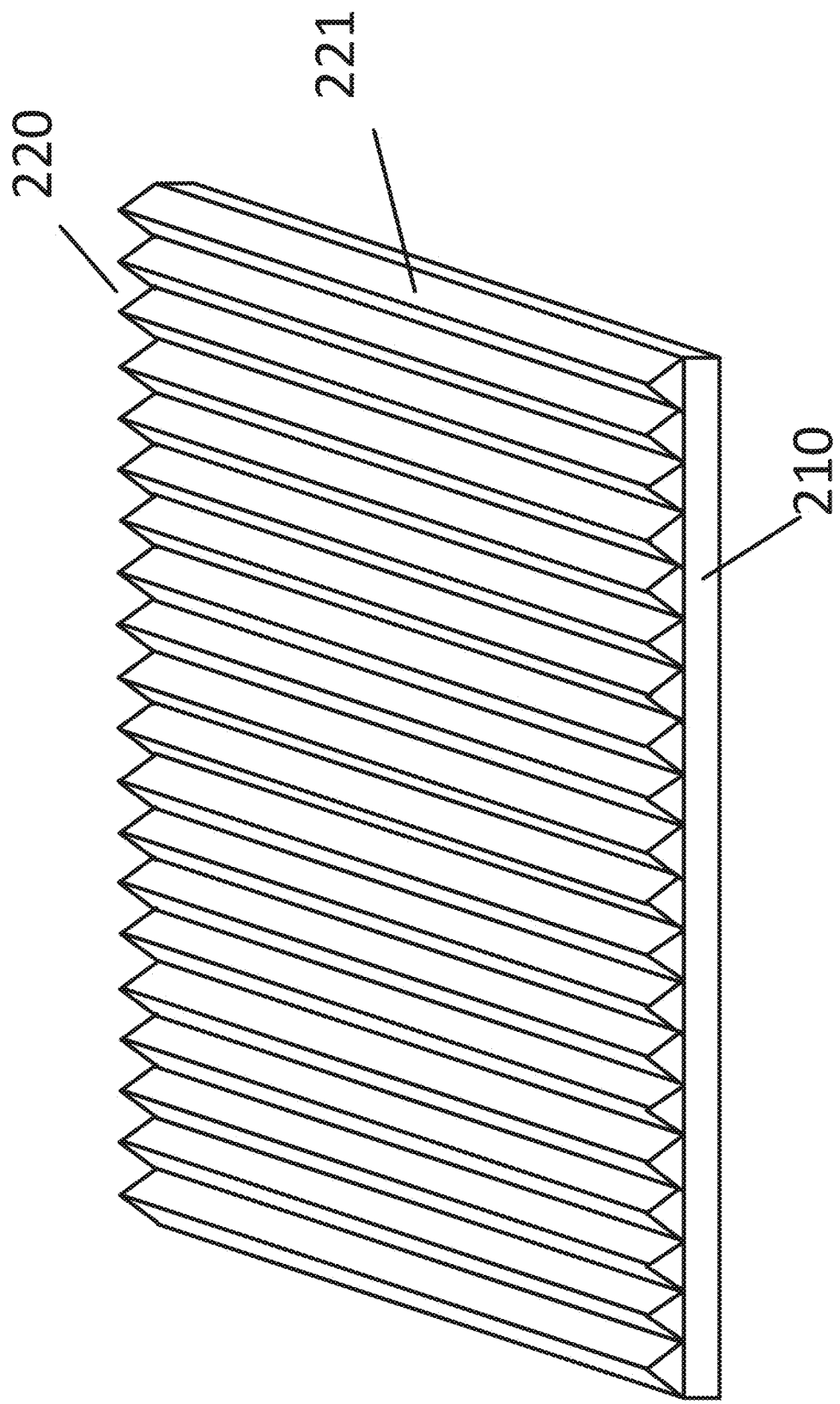
FIG. 9 is a schematic view of a light-enhancing layer of a smectic liquid crystal display module.

The display layer is shown in FIG. 8, and has been disclosed in the prior art, so the structure of the display layer is not described in detail herein. The back layer may be made of PET or PC or a plastic or paper material, and the back layer may be black, white or other colors. The light enhancing layer is shown in FIG. 9 and is transparent, and has a high light transmittance. The base plate is made of PET material, and the light enhancing member may be a light enhancing film or prism structure. The light enhancing film is a layer of resin film having a high refractive index in the range of 1.65 to 1.8, and the prism structure is made of a resin having a high refractive index in the 1.65 to 1.8. In practice, the resin film having a high refractive index may be cut to obtain a prism structure. The prism structure disposed on the surface of the base plate facing the display layer and the surface of the base plate facing the back layer may be set in a convex or concave form, and the prism structure disposed on the surface of the base plate facing the display layer may be the same as or different from the prism structure disposed on the surface of the base plate facing the back layer.

The Mixed Layer of the Smectic Liquid Crystal Material

The mixed liquid crystal layer is generally formed by mixing the above high scattering smectic material, a conductive materials, a spacer and sometimes a polymer.

1) The mixed layer is formed by mixing the above high scattering smectic material, a conductive material and a spacer.

The smectic liquid crystal may be the high scattering smectic liquid crystal material of the present invention.

The spacer is a spacer ball or spacer rod made of a polyester or a polystyrene or a glass material.

The composition of the mixed layer is: the high scattering smectic material of 0.0002% to 99.99%, the conductive material of 0.0001% to 10%, and the spacer of 0.0001% to 90%, based on the total weight of the mixture.

2) The mixed layer contains a mixture encapsulated in the polymer structure and formed by the high scattering smectic material, a conductive material and a spacer:

The smectic liquid crystal may be the high scattering smectic liquid crystal material of the present invention.

The spacer is a spacer ball or spacer rod made of a polyester or a polystyrene or a glass material.

The polymer structure is formed by a monomer material or polymer material, and is directly printed or etched or nano-imprinted or jet-printed on an inner surface of a corresponding layer, and is thermally or UV cured into a polymer material having a given structure. The monomer material is any one of an epoxy resin monomer, a polyacrylate monomer or a polymethacrylate monomer.

The composition of the mixed layer is: the high scattering smectic material of 0.0002% to 99.99%, the polymer material of 0.0001% to 80%, the conductive material of 0.0001% to 10%, and the spacer of 0.0001% to 80%, based on the total weight of the mixture.

The polymer structure forms an accommodation cavity for accommodating a mixture formed by the high scattering smectic material, the conductive material and the spacer, and the polymer structure is in the form of regular ball, micro-cylinder, fiber, hemisphere, parallel strip, cube, rectangle, cross-wire form, network structure, square grating structure, irregular polygonal structure, or any of combinations thereof. The polymer structure is uniform or non-uniform, and is miscible or dispersible with the high scattering smectic material, the conductive material and the spacer, or contacted or spaced with the high scattering smectic material, the conductive material and the spacer.

The high scattering smectic material of the present invention may also be filled between two plastic films or two pieces of glass having a conducting layer to serve as a dimming medium, and may be filled in vacuum into a lattice screen to serve as a display device.

In order to control the thickness of the crystal liquid cell, in the high scattering smectic material of the present invention, a spacer ball or spacer rod made of polyester or polystyrene— or a glass material may be added; in order to reduce the working viscosity and improve the bonding firmness of the liquid crystal cell, a prepolymer may be added in the high scattering smectic material; and in order to achieve the effect of color display, a dichroic dye may be added in the high scattering smectic material.

The high scattering liquid crystal material of the present invention is applied to a smectic display device, so as achieve the application of the high scattering liquid crystal material in a display, by means of the excellent optical structure and drive method of the smectic display device. Application of the high scattering liquid crystal materials can provide a smectic liquid crystal display having an excellent optical structure.

The application of the high scattering smectic material of the present invention is not limited to using as the material in the dimming medium or a display device, and the high scattering smectic material of the present invention can be used in all of the devices with a dual-frequency drive mode of low-frequency frosting and high-frequency clearing.

What is claimed is:

1. A high scattering smectic liquid crystal material, comprising:

two or more compounds of Formula (I),

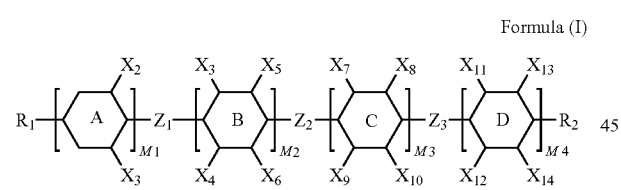

Formula (I)

wherein $R_1$ is $C_1$-$C_{20}$ alkyl, $C_1$-$C_{20}$ alkoxy, $C_1$-$C_{20}$ alkenyl, $C_1$-$C_{20}$ alkenyloxy, silanyl, siloxanyl and halogenated groups thereof; and $C_1$-$C_{20}$ alkyl, $C_1$-$C_{20}$ alkoxy, $C_1$-$C_{20}$ alkenyl, $C_1$-$C_{20}$ alkenyloxy, silanyl and siloxanyl and isomers thereof with any —$CH_2$— substituted with —O—, —S—, —$CF_2$—, —$CF_2O$—, —CO—, —COO—, —O—CO—, —O—COO—, —CF=CF—, —CH=CF—, —CF=CH— or —CH=CH—;

$R_2$ is CN, F, NCS, NCO, $CF_3$, $CHF_2$, $CH_2F$, $OCF_3$, $OCHF_2$, $OCH_2F$, $NO_2$, Cl, CH=$CF_2$ and OCH=$CF_2$; $C_1$-$C_{20}$ alkyl, $C_1$-$C_{20}$ alkoxy, $C_1$-$C_{20}$ alkenyl, $C_1$-$C_{20}$ alkenyloxy, silanyl, siloxanyl and halogenated groups thereof; and $C_1$-$C_{20}$ alkyl, $C_1$-$C_{20}$ alkoxy, $C_1$-$C_{20}$ alkenyl and $C_1$-$C_{20}$ alkenyloxy and isomers thereof with any —$CH_2$— substituted with —O—, —S—, —$CF_2$—, —$CF_2O$—, —CO—, —COO—, —O—CO—, —O—COO—, —CF=CF—, —CH=CF—, —CF=CH— or —CH=CH—;

A, B, C and D each has a rigid ring structure and each independently comprises:

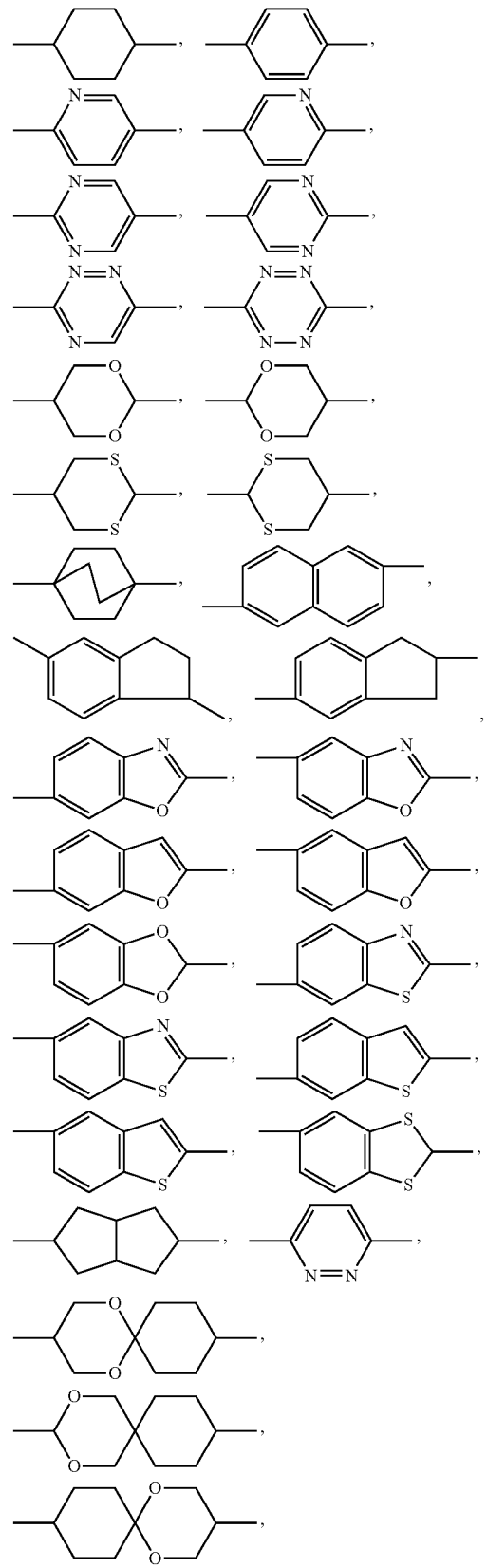

-continued

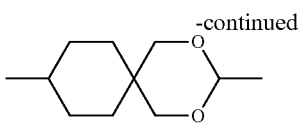

or cycloalkenyl; wherein the hydrogen atoms on the ring structures are either unsubstituted or independently substituted;

$Z_1$, $Z_2$, and $Z_3$ are independently: a single bond, $C_1$-$C_{20}$ alkyl, $C_1$-$C_{20}$ alkoxy, $C_1$-$C_{20}$ alkenyl, $C_1$-$C_{20}$ alkenyloxy, silanyl and siloxanyl; and $C_1$-$C_{20}$ alkyl, $C_1$-$C_{20}$ alkoxy, $C_1$-$C_{20}$ alkenyl, $C_1$-$C_{20}$ alkenyloxy, silanyl and siloxanyl and isomers thereof with any —$CH_2$— substituted with —O—, —S—, —CO—, —COO—, —O—CO—, —O—COO, —CF=CF—, —CHF—, —$CF_2$—, —$CF_2$O—, —$CH_2$O—, —$OCH_2$—, —CH=CH—, —CH=N—, —CH=N—N=CH—, —CH=CF—, —CF=CH—, —$CH_2CF_2$—, —$CF_2CH_2$— or

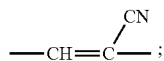

$X_1$ to $X_{14}$ are independently: H, CN, NCS, F, Cl, $CF_3$, $CHF_2$, $CH_2F$, $OCF_3$, $OCHF_2$, $OCH_2F$, $NO_2$, alkyl or alkoxy; and M1, M2, M3 and M4 are independently 0, 1 or 2, and M1+M2+M3+M4≥2; and one or more ionic compounds of Formula (II), $$R_3—X^+Y^-  \quad \text{Formula (II)}$$

wherein $R_3$ is: $C_0$-$C_{20}$ alkyl, $C_0$-$C_{20}$ alkoxy, $C_0$-$C_{20}$ alkenyl and $C_0$-$C_{20}$ alkenyloxy and halogenated groups thereof; ferrocenylmethyl and phenyl; and $C_0$-$C_{20}$ alkyl, $C_0$-$C_{20}$ alkoxy, $C_0$-$C_{20}$ alkenyl and $C_0$-$C_{20}$ alkenyloxy and isomers thereof with any —$CH_2$— substituted with —O—, —S—, —$CF_2$—, —$CF_2$O—, —CO—, —COO—, —O—CO—, —O—COO—, —CF=CF—, —CH=CF—, —CF=CH—, —CH=CH—,

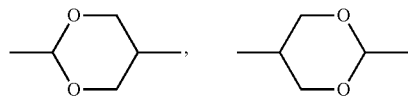

or phenyl;

$X^+$ is a cation selected from the group consisting of: $Na^+$, $K^+$, $N^+$, $[(R_4)_3]N^+$, $[(R_4)_3]P^+$,

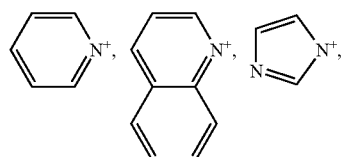

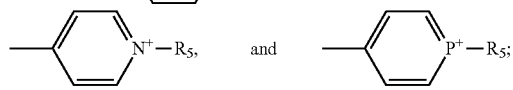

wherein $R_4$ is $C_1$-$C_{30}$ alkyl, $C_1$-$C_{30}$ alkoxy, $C_1$-$C_{30}$ alkenyl, $C_1$-$C_{30}$ alkenyloxy or halogenated groups thereof, or phenyl;

and $R_5$ is $C_1$-$C_{30}$ alkyl, $C_1$-$C_{30}$ alkoxy, $C_1$-$C_{30}$ alkenyl, $C_1$-$C_{30}$ alkenyloxy, or halogenated groups thereof, or phenyl; and $Y^-$ is an anion selected from the group consisting of: $F^-$, $Cl^-$, $Br^-$, $I^-$, $(PF_6)^-$, $(Ph_4B)^-$, $SO_4^-$, $ClO_4^-$ and

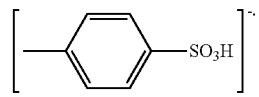

2. The high scattering smectic liquid crystal material of claim 1, wherein in the compounds of Formula (I):

$R_1$ is: $C_1$-$C_{15}$ alkyl, $C_1$-$C_{15}$ alkoxy, $C_1$-$C_{15}$ alkenyl, $C_1$-$C_{15}$ alkenyloxy, silanyl, siloxanyl and halogenated groups thereof, $C_1$-$C_{15}$ alkyl, $C_1$-$C_{15}$ alkoxy, $C_1$-$C_{15}$ alkenyl, $C_1$-$C_{15}$ alkenyloxy, or silanyl and siloxanyl and isomers thereof with any —$CH_2$— substituted with —O— or —S—;

$R_2$ is: CN, F, NCS, $CF_3$, $CHF_2$, $CH_2F$, $OCF_3$, $OCHF_2$, $OCH_2F$, Cl; $C_1$-$C_{15}$ alkyl, $C_1$-$C_{15}$ alkoxy, $C_1$-$C_{15}$ alkenyl, $C_1$-$C_{15}$ alkenyloxy, silanyl and siloxanyl and halogenated groups thereof, $C_1$-$C_{15}$ alkyl, $C_1$-$C_{15}$ alkoxy, or $C_1$-$C_{15}$ alkenyl and $C_1$-$C_{15}$ alkenyloxy and isomers thereof with —$CH_2$— substituted with —O— or —S—;

A, B, C and D are independently selected from the group consisting of:

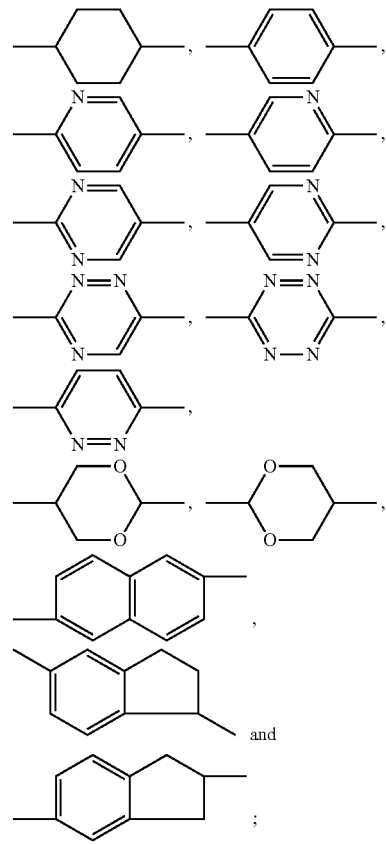

$Z_1$ to $Z_3$ are independently selected from the group consisting of: a single bond, —$C_2H_4$—, —CH=CH—, —C≡C—, —$CF_2$O—, —$CH_2$O—, —COO— and —CH=N—N=CH—;

$X_1$ to $X_{14}$ are independently selected from the group consisting of: H, CN, NCS, F, Cl and $CF_3$; and M1, M2, M3 and M4 are independently 0 or 1, and M1+M2+M3+M4≥2.

3. The high scattering smectic liquid crystal material of claim 2, wherein in the compounds of Formula (I):

$R_1$ is selected from the group consisting of: $C_1$-$C_{10}$ alkyl, $C_1$-$C_{10}$ alkoxy, $C_1$-$C_{10}$ alkenyl, silanyl, siloxanyl and halogenated groups thereof, $C_1$-$C_{10}$ alkyl, $C_1$-$C_{10}$ alkoxy, $C_1$-$C_{10}$ alkenyl, silanyl, and siloxanyl and isomers thereof with any —$CH_2$— in the groups substituted with —O—;

$R_2$ is CN, F, NCS, $CF_3$ or $OCF_3$;

A, B, C and D are independently selected from the group consisting of:

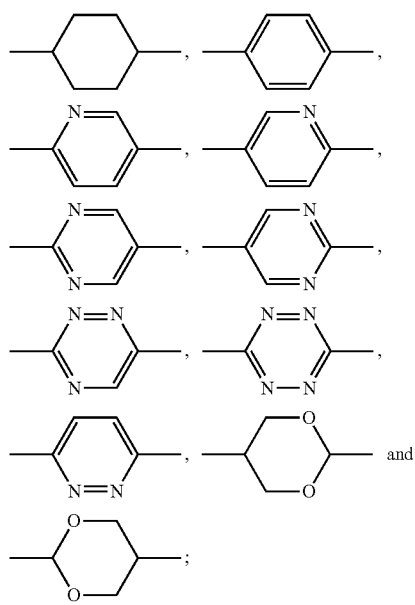

$Z_1$ to $Z_3$ are independently selected from the group consisting of: a single bond, —$C_2H_4$—, —CH=CH—, —C≡C—, —$CF_2O$—, —$CH_2O$— and —COO—; and $X_1$ to $X_{14}$ are independently selected from the group consisting of: H, CN, F and Cl.

4. The high scattering smectic liquid crystal material of claim 3, wherein the compounds of Formula (I) are alkynes having a structure of Formula (III), Formula (III)

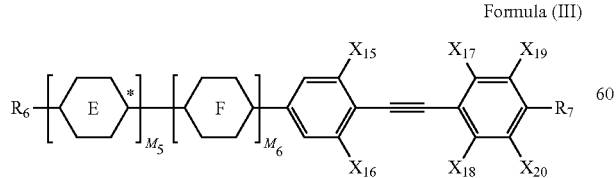

wherein $R_6$ is $C_1$-$C_{10}$ alkyl or $C_1$-$C_{10}$ alkoxy;

$R_7$ is CN, NCS or F;

E and F are independently selected from the group consisting of:

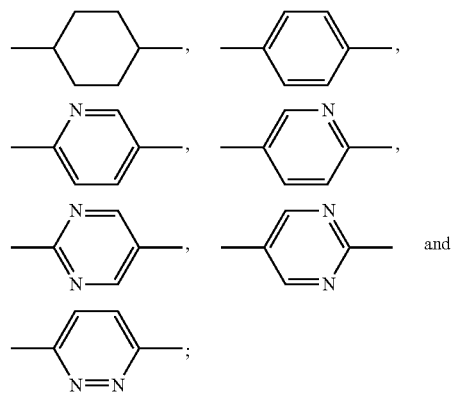

$X_{15}$ to $X_{20}$ are independently H or F; and $M_5$ and $M_6$ are independently 0 or 1.

5. The high scattering smectic liquid crystal material of claim 3, wherein the compounds of Formula (I) are heterocyclic compounds having a structure of Formula (IV), Formula (IV)

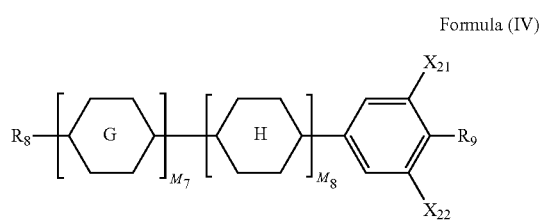

wherein $R_8$ is $C_1$-$C_{10}$ alkyl or $C_1$-$C_{10}$ alkoxy;

$R_9$ is CN, NCS or F;

G and H are independently selected from the group consisting of:

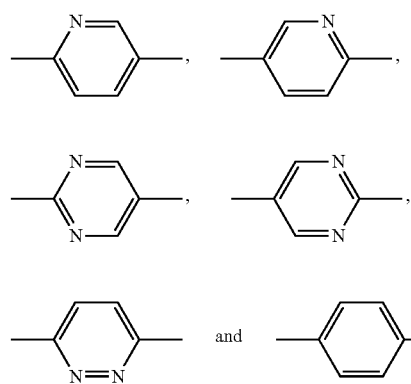

$X_{21}$ to $X_{22}$ are independently H or F; and $M_7$ and $M_8$ are independently 0 or 1, and $M_7$+$M_8$≥1.

6. The high scattering smectic liquid crystal material of claim 3, wherein the compounds of Formula (I) are difluoro ether compounds having a structure of Formula (V), Formula (V)

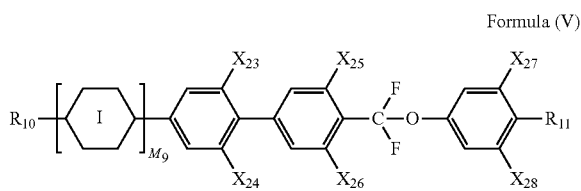

wherein $R_{10}$ is $C_1$-$C_{10}$ alkyl or $C_1$-$C_{10}$ alkoxy;
$R_{11}$ is CN, NCS or F;
I is a ring structure selected from the group consisting of:

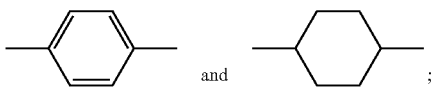

$X_{23}$ to $X_{28}$ are independently H or F; and
$M_9$ is 0 or 1.

7. The high scattering smectic liquid crystal material of claim 3, wherein the compound of Formula (I) are polycyclic biphenyl compounds having a structure of Formula (VI), Formula (VI)

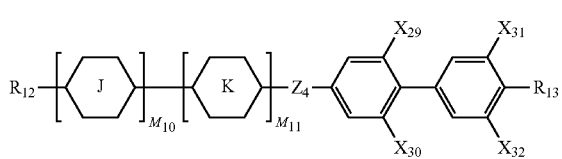

wherein $R_{12}$ is $C_1$-$C_{10}$ alkyl or $C_1$-$C_{10}$ alkoxy;
$R_{13}$ is CN, NCS or F;
J and K are ring structures independently selected from the group consisting of:

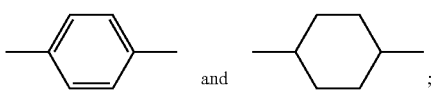

$Z_4$ is selected from the group consisting of: a single bond, —COO—, —$C_2H_4$— and;
$X_{29}$ to $X_{32}$ are independently H or F; and
$M_{10}$ and $M_{11}$ are independently 0 or 1.

8. The high scattering smectic liquid crystal material of claim 3, wherein the high scattering smectic liquid crystal material comprises a smectic A, B, C, D, E, F, G, H or I phase liquid crystal material.

9. The high scattering smectic liquid crystal material of claim 8, wherein the high scattering smectic liquid crystal material further comprises at least one compound selected from the group consisting of: alkyne compounds, heterocyclic compounds, difluoro ether compounds and polycyclic biphenyl compounds.

10. The high scattering smectic liquid crystal material of claim 1, wherein in the ionic compound of Formula (II),
$R_3$ is selected from the group consisting of: $C_0$-$C_{16}$ alkyl, $C_0$-$C_{16}$ alkoxy, $C_0$-$C_{16}$ alkenyl, $C_0$-$C_{16}$ alkenyloxy, ferrocenylmethyl and phenyl; and $C_0$-$C_{16}$ alkyl, $C_0$-$C_{16}$ alkoxy, $C_0$-$C_{16}$ alkenyl and $C_0$-$C_{16}$ alkenyloxy and isomers thereof with any —$CH_2$— substituted with —O—, —S—, and phenyl;

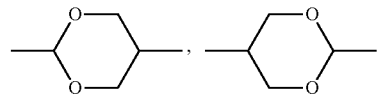

$X^+$ is a cation selected from the group consisting of: $Na^+$, $K^+$, $N^+$, $[(R_4)_3]N^+$, $[(R_4)_3]P^+$,

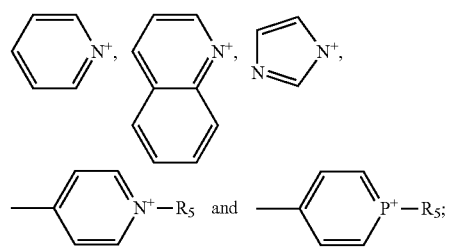

wherein $R_4$ is $C_1$-$C_{20}$ alkyl, $C_1$-$C_{20}$ alkoxy, $C_1$-$C_{20}$ alkenyl, $C_1$-$C_{20}$ alkenyloxy, or halogenated groups thereof, or phenyl; and $R_5$ is $C_1$-$C_{20}$ alkyl, $C_1$-$C_{20}$ alkoxy, $C_1$-$C_{20}$ alkenyl, $C_1$-$C_{20}$ alkenyloxy, or halogenated groups thereof, and phenyl; and
$Y^-$ is an anion selected from the group consisting of: $F^-$, $Cl^-$, $Br^-$, $(PF_6)^-$, $(Ph_4B)^-$, $SO_4^-$, $ClO_4^-$, and

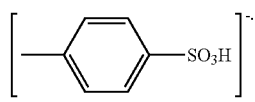

11. The high scattering smectic liquid crystal material of claim 10, wherein in the ionic compound of Formula (II),
$R_3$ is selected from the group consisting of: $C_0$-$C_{16}$ alkyl, phenyl, $C_0$-$C_{16}$ heteroalkyl with any —$CH_2$— substituted with

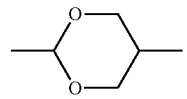

or phenyl, and isomers thereof;
$X^+$ is a cation selected from the group consisting of: $Na^+$, $K^+$, $N^+$, $[(R_4)_3]N^+[(R_4)_3]P^+$,

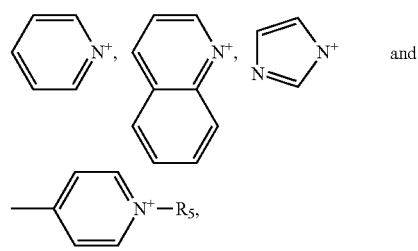

wherein $R_4$ is $C_1$-$C_{16}$ alkyl or phenyl; and $R_5$ is $C_1$-$C_{16}$ alkyl or phenyl; and
$Y^-$ is an anion selected from the group consisting of: $F^-$, $Cl^-$, $Br^-$, $(PF_6)^-$, $(Ph_4B)^-$, $SO_4^-$ and $ClO_4^-$.

12. The high scattering smectic liquid crystal material of claim 11, wherein the ionic compounds are compounds having a structure of Formula (VII),

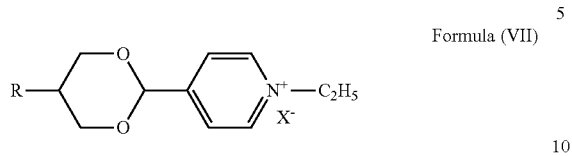

Formula (VII)

wherein R is selected from the group consisting of: $C_0$-$C_{16}$ alkyl and $C_0$-$C_{16}$ terminal alkenyl; and $X^-$ is an anion selected from the group consisting of: $F^-$, $Cl^-$, $Br^-$, $(PF_6)^-$, $(Ph_4B)^-$, $SO_4^-$ and $ClO_4^-$.

13. The high scattering smectic liquid crystal material of claim 1, wherein the high scattering smectic liquid crystal material is a smectic A phase material, or a non-smectic A phase material having a degree of order higher than that of the smectic A phase.

14. The high scattering smectic liquid crystal material of claim 13, wherein the compound of Formula (I) is 1% to 99.9999% of the total weight of a mixed liquid crystal layer, and the ionic compounds of Formula (II) is 0.0001% to 10% of the total weight of the mixed liquid crystal.

15. The high scattering smectic liquid crystal material of claim 1, wherein a spacer ball, a spacer rod, a prepolymer or a dichroic dye made of a polyester material, a polystyrene material, or a glass material, is further added to the high scattering smectic liquid crystal material.

16. A device comprising a high scattering smectic liquid crystal material, wherein the high scattering smectic liquid crystal material comprises two or more compounds of Formula (I) and one or more ionic compounds of Formula (II):

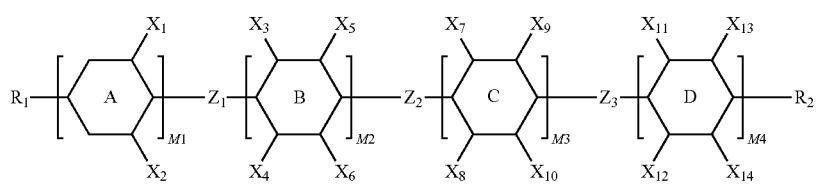

Formula (I)

Formula (II)

wherein $R_1$ is $C_1$-$C_{20}$ alkyl, $C_1$-$C_{20}$ alkoxy, $C_1$-$C_{20}$ alkenyl, $C_1$-$C_{20}$ alkenyloxy, silanyl, siloxanyl and halogenated groups thereof; and $C_1$-$C_{20}$ alkyl, $C_1$-$C_{20}$ alkoxy, $C_1$-$C_{20}$ alkenyl, $C_1$-$C_{20}$ alkenyloxy, silanyl and siloxanyl and isomers thereof with any —$CH_2$— substituted with —O—, —S—, —$CF_2$—, —$CF_2O$—, —CO—, —COO—, —O—CO—, —O—COO—, —CF=CF—, —CH=CF—, —CF=CH— or —CH=CH—;

$R_2$ is CN, F, NCS, NCO, $CF_3$, $CHF_2$, $CH_2F$, $OCF_3$, $OCHF_2$, $OCH_2F$, $NO_2$, Cl, CH=$CF_2$ and OCH=$CF_2$; $C_1$-$C_{20}$ alkyl, $C_1$-$C_{20}$ alkoxy, $C_1$-$C_{20}$ alkenyl, $C_1$-$C_{20}$ alkenyloxy, silanyl, siloxanyl and halogenated groups thereof; and $C_1$-$C_{20}$ alkyl, $C_1$-$C_{20}$ alkoxy, $C_1$-$C_{20}$ alkenyl and $C_1$-$C_{20}$ alkenyloxy and isomers thereof with any —$CH_2$— substituted with —O—, —S—, —$CF_2$—, —$CF_2O$—, —CO—, —COO—, —O—CO—, —O—COO—, —CF=CF—, —CH=CF—, —CF=CH— or —CH=CH—;

A, B, C and D each has a rigid ring structure and each independently comprises:

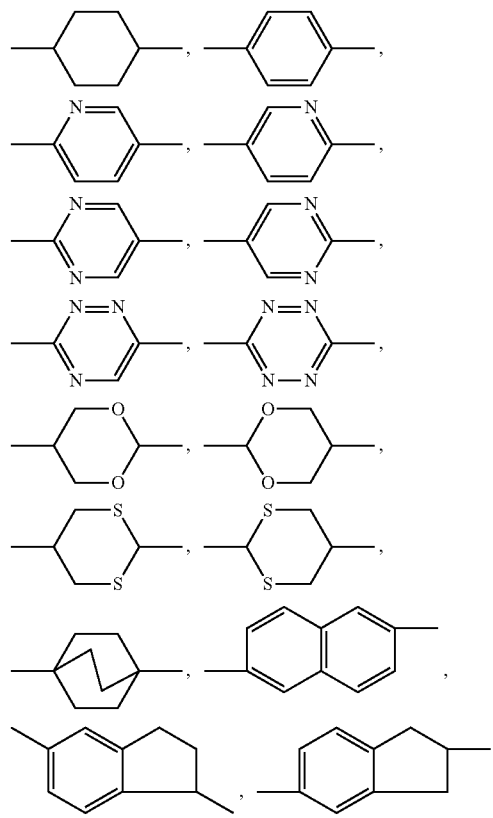

-continued

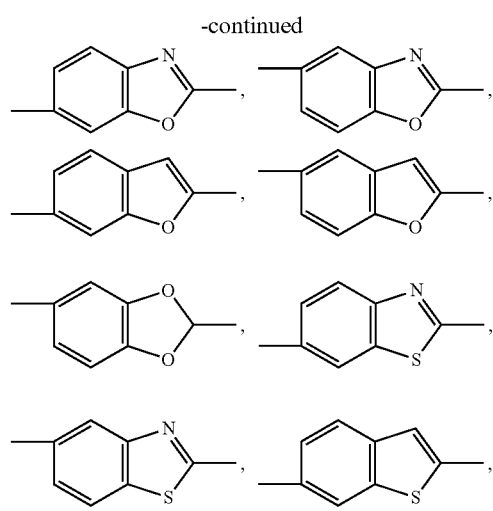

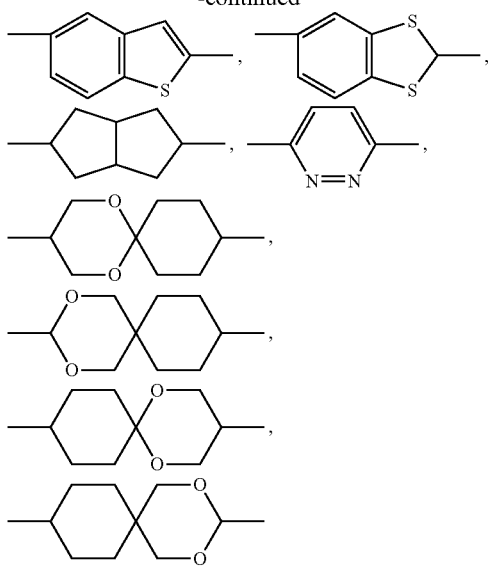

or cycloalkenyl; wherein the hydrogen atoms on the ring structures are either unsubstituted or independently substituted;

$Z_1$, $Z_2$, and $Z_3$ are independently: a single bond, $C_1$-$C_{20}$ alkyl, $C_1$-$C_{20}$ alkoxy, $C_1$-$C_{20}$ alkenyl, $C_1$-$C_{20}$ alkenyloxy, silanyl and siloxanyl; and $C_1$-$C_{20}$ alkyl, $C_1$-$C_{20}$ alkoxy, $C_1$-$C_{20}$ alkenyl, $C_1$-$C_{20}$ alkenyloxy, silanyl and siloxanyl and isomers thereof with any —CH$_2$— substituted with —O—, —S—, —CO—, —COO—, —O—CO—, —O—COO, —CF=CF—, —CHF—, —CF$_2$—, —CF$_2$O—, —CH$_2$O—, —OCH$_2$—, —CH=CH—, —CH=N—, —CH=N—N=CH—, —CH=CF—, —CF=CH—, —CH$_2$CF$_2$—, —CF$_2$CH$_2$— or

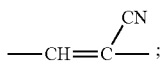

$X_1$ to $X_{14}$ are independently: H, CN, NCS, F, Cl, CF$_3$, CHF$_2$, CH$_2$F, OCF$_3$, OCHF$_2$, OCH$_2$F, NO$_2$, alkyl or alkoxy;

M1, M2, M3 and M4 are independently 0, 1 or 2, and M1+M2+M3+M4≥2;

wherein $R_3$ is: $C_0$-$C_{20}$ alkyl, $C_0$-$C_{20}$ alkoxy, $C_0$-$C_{20}$ alkenyl and $C_0$-$C_{20}$ alkenyloxy and halogenated groups thereof; ferrocenylmethyl and phenyl; and $C_0$-$C_{20}$ alkyl, $C_0$-$C_{20}$ alkoxy, $C_0$-$C_{20}$ alkenyl and $C_0$-$C_{20}$ alkenyloxy and isomers thereof with any —CH$_2$— substituted with —O—, —S—, —CF$_2$—, —CF$_2$O—, —CO—, —COO—, —O—CO—, —O—COO—, —CF=CF—, —CH=CF—, —CF=CH—, —CH=CH—,

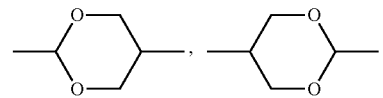

or phenyl;

$X^+$ is a cation selected from the group consisting of: Na$^+$, K$^+$, N$^+$, [(R$_4$)$_3$]N$^+$, [(R$_4$)$_3$]P$^+$,

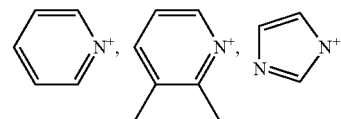

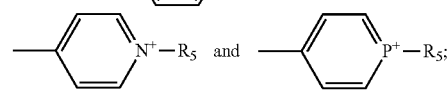

wherein $R_4$ is $C_1$-$C_{30}$ alkyl, $C_1$-$C_{30}$ alkoxy, $C_1$-$C_{30}$ alkenyl, $C_1$-$C_{30}$ alkenyloxy or halogenated groups thereof, or phenyl; and $R_5$ is $C_1$-$C_{30}$ alkyl, $C_1$-$C_{30}$ alkoxy, $C_1$-$C_{30}$ alkenyl, $C_1$-$C_{30}$ alkenyloxy, or halogenated groups thereof, or phenyl; and $Y^-$ is an anion selected from the group consisting of: F$^-$, Cl$^-$, Br$^-$, I$^-$, (PF$_6$)$^-$, (Ph$_4$B)$^-$, SO$_4^-$, ClO$_4^-$ and

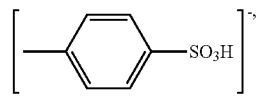

and wherein the device has a capacitor capable of applying electric energy in dual waveforms, one waveform is high-frequency drive pulse for clearing operation, and the other waveform is low-frequency drive pulse for frosting operation.

\* \* \* \* \*